(12) United States Patent
Hamashima

(10) Patent No.: US 9,341,935 B2
(45) Date of Patent: May 17, 2016

(54) IMAGE CAPTURING DEVICE

(75) Inventor: Muneki Hamashima, Fukaya (JP)

(73) Assignee: NIKON CORPORATION, Tokyo (JP)

( * ) Notice: Subject to any disclaimer, the term of this patent is extended or adjusted under 35 U.S.C. 154(b) by 985 days.

(21) Appl. No.: 13/520,873

(22) PCT Filed: Mar. 2, 2011

(86) PCT No.: PCT/JP2011/054774
§ 371 (c)(1),
(2), (4) Date: Jul. 6, 2012

(87) PCT Pub. No.: WO2011/108592
PCT Pub. Date: Sep. 9, 2011

(65) Prior Publication Data
US 2012/0300041 A1 Nov. 29, 2012

(30) Foreign Application Priority Data

Mar. 3, 2010 (JP) .................. 2010-046733

(51) Int. Cl.
*H04N 15/00* (2006.01)
*G03B 35/08* (2006.01)
*H04N 13/02* (2006.01)
(Continued)

(52) U.S. Cl.
CPC ............... *G03B 35/08* (2013.01); *G03B 35/10* (2013.01); *H04N 13/0055* (2013.01); *H04N 13/021* (2013.01); *H04N 13/0228* (2013.01); *H04N 13/0232* (2013.01); *H04N 13/0239* (2013.01);
(Continued)

(58) Field of Classification Search
CPC ............ H04N 13/021; H04N 13/0055; H04N 13/0239; H04N 13/0497; G02B 27/2214
See application file for complete search history.

(56) References Cited

U.S. PATENT DOCUMENTS 5,687,307 A * 11/1997 Akisada et al. ............... 345/428
8,502,911 B2 8/2013 Yamamoto et al.
(Continued)

FOREIGN PATENT DOCUMENTS

CN 101656835 A 2/2010
EP 2 157 801 A2 2/2010
(Continued)

OTHER PUBLICATIONS

May 17, 2011 International Search Report issued in International Patent Application No. PCT/JP2011/054774.
(Continued)

*Primary Examiner* — Shawn An
(74) *Attorney, Agent, or Firm* — Oliff PLC

(57) ABSTRACT

An image capture device includes: a plurality of microlenses; an image capture element in which a plurality of element groups including a plurality of photoelectric conversion elements that receive light fluxes and that output image signals are arranged; a generation unit that extracts a plurality of region image signals respectively corresponding to a plurality of different partial regions upon the pupil surface of the photographic optical system, and that generates a plurality of sets of image data corresponding to the partial regions as a plurality of sets of viewpoint image data whose viewpoint positions are different with each other; and a reception unit that receives a viewpoint number selection operation to select a number of viewpoints; wherein the generation unit generates the sets of viewpoint image data by extracting the region image signals whose number is equal to a number of selected viewpoints.

9 Claims, 15 Drawing Sheets

(51) Int. Cl.
*H04N 13/00* (2006.01)
*H04N 13/04* (2006.01)
*G03B 35/10* (2006.01)
*G02B 27/22* (2006.01)

(52) U.S. Cl.
CPC ........ *H04N 13/0497* (2013.01); *G02B 27/2214* (2013.01)

(56) References Cited

U.S. PATENT DOCUMENTS

| | | | |
|---|---|---|---|
| 2002/0101506 A1* | 8/2002 | Suzuki | 348/51 |
| 2005/0122549 A1* | 6/2005 | Goulanian et al. | 359/3 |
| 2006/0082574 A1* | 4/2006 | Tsubaki | G09G 3/003 345/419 |
| 2006/0192776 A1* | 8/2006 | Nomura et al. | 345/419 |
| 2007/0202949 A1* | 8/2007 | Kawade et al. | 463/32 |
| 2010/0045844 A1* | 2/2010 | Yamamoto et al. | 348/340 |

FOREIGN PATENT DOCUMENTS

| | | |
|---|---|---|
| JP | A-8-47001 | 2/1996 |
| JP | A-2007-4471 | 1/2007 |
| JP | A-2010-26332 | 2/2010 |
| JP | A-2010-263572 | 11/2010 |

OTHER PUBLICATIONS

Mar. 9, 2015 Office Action issued in Chinese Patent Application No. 201180012101.5.

Nov. 19, 2013 Office Action issued in Japanese Patent Application No. 2010-046733 (with translation).

* cited by examiner

FIG.2
(a)
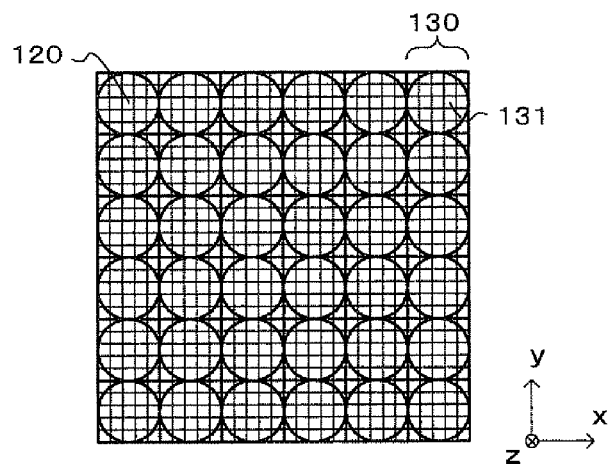
(b)
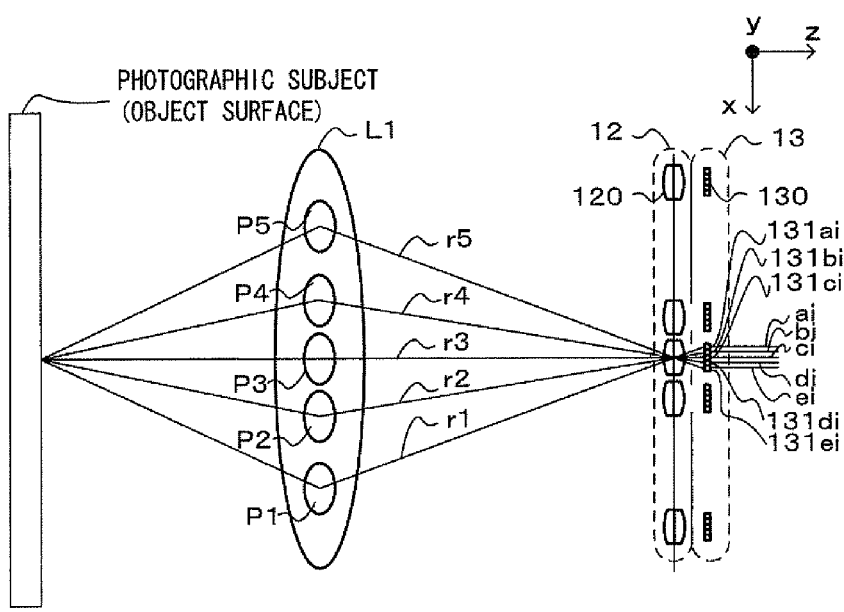
(c)
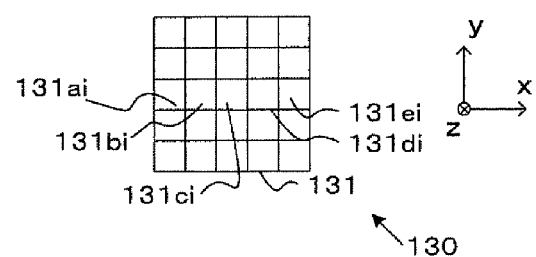

FIG.3
(a)
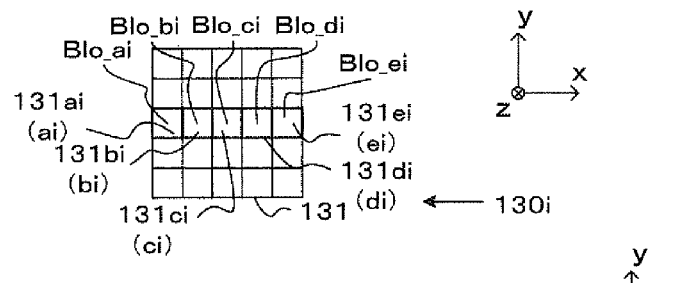
(b)
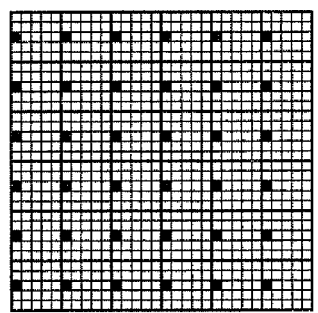
SET OF IMAGE DATA IM_A
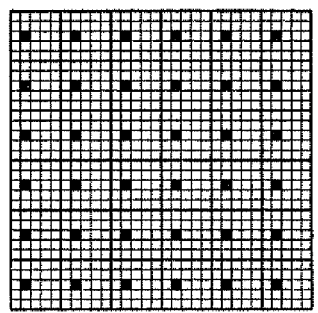
SET OF IMAGE DATA IM_B
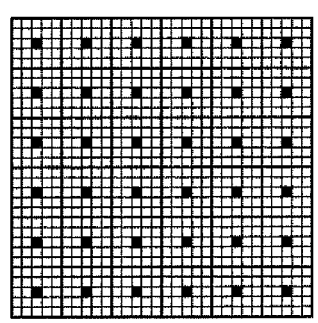
SET OF IMAGE DATA IM_C
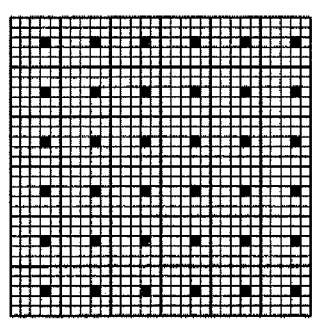
SET OF IMAGE DATA IM_D
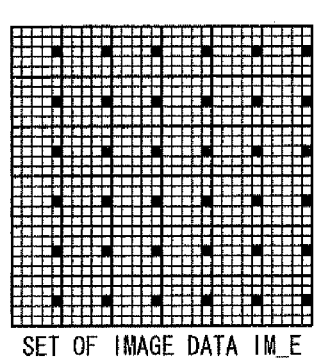
SET OF IMAGE DATA IM_E FIG.4
(a)
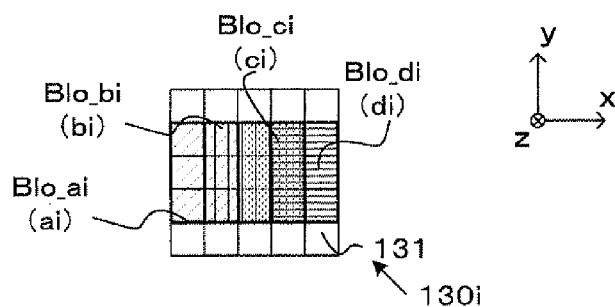
(b)
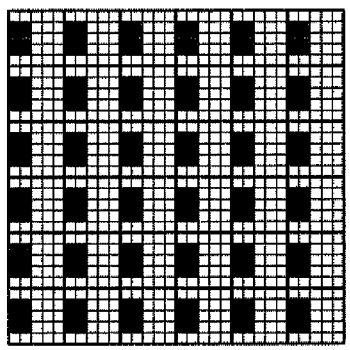 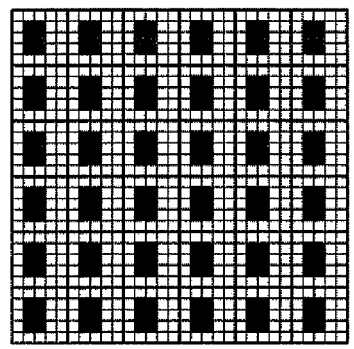
SET OF IMAGE DATA IM_A    SET OF IMAGE DATA IM_B
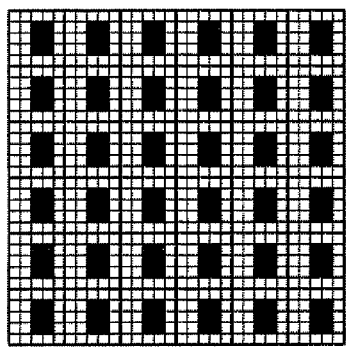 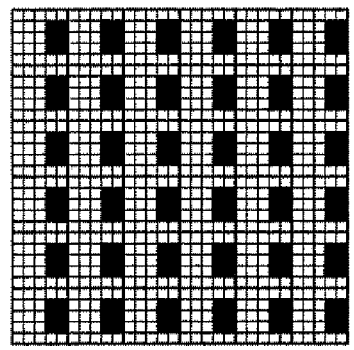
SET OF IMAGE DATA IM_C    SET OF IMAGE DATA IM_D FIG.5
(a)
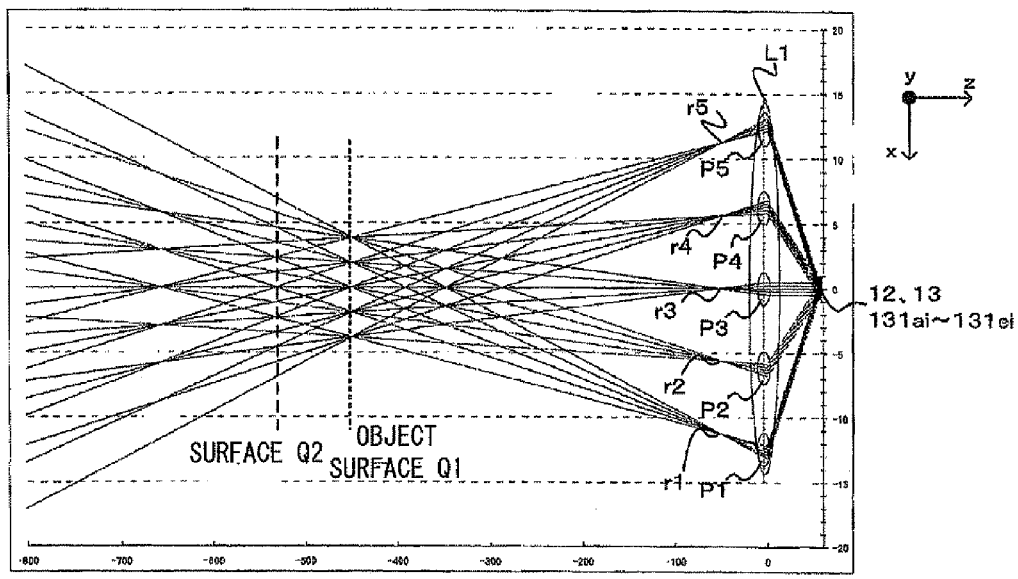
(b)
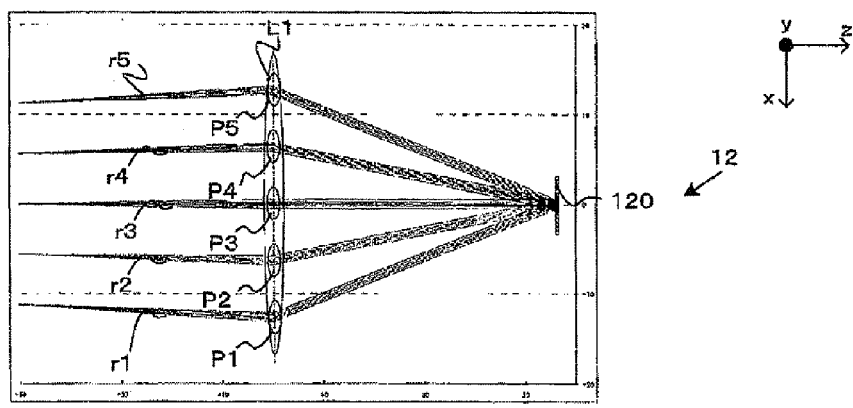
(c)
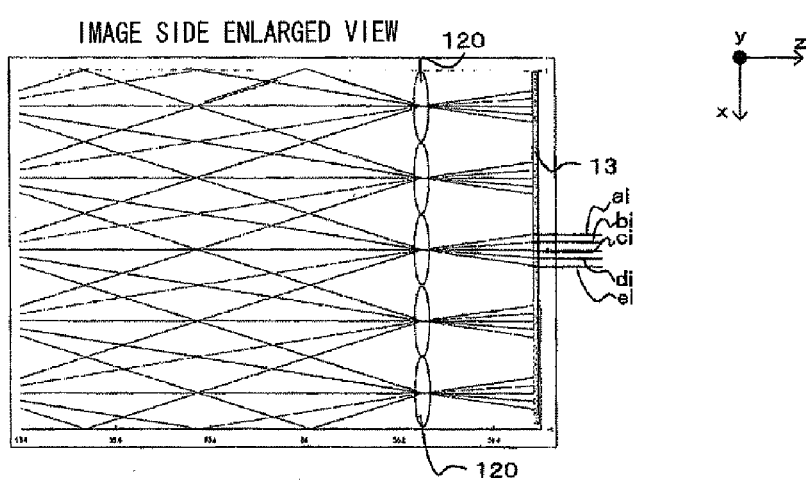

FIG. 6
(a)
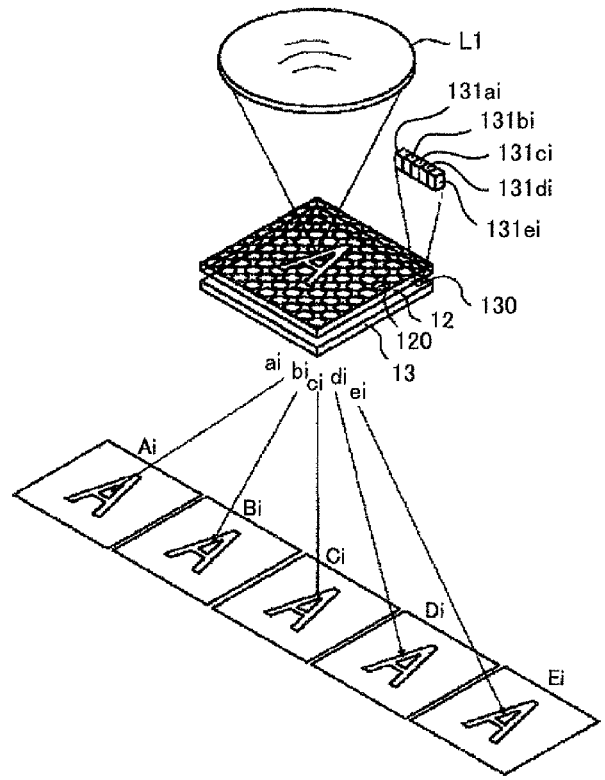
(b)
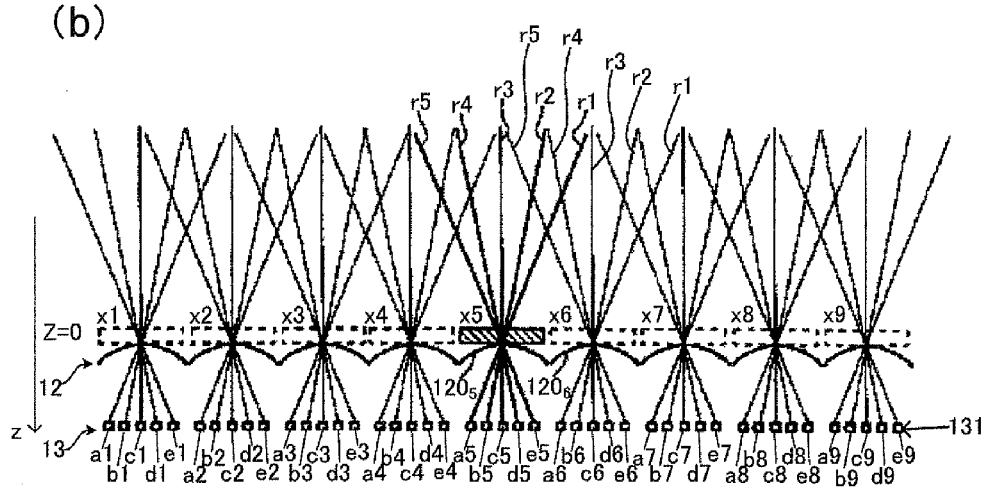

FIG.7
(a)
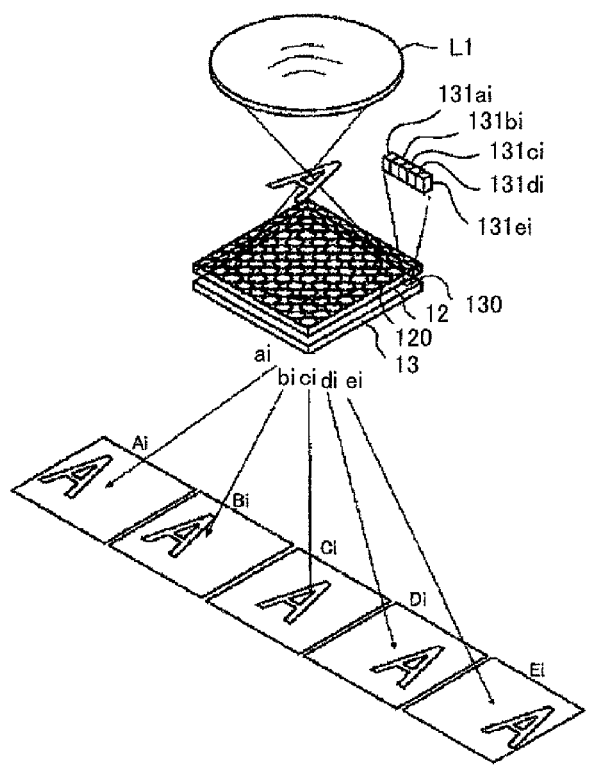
(b)
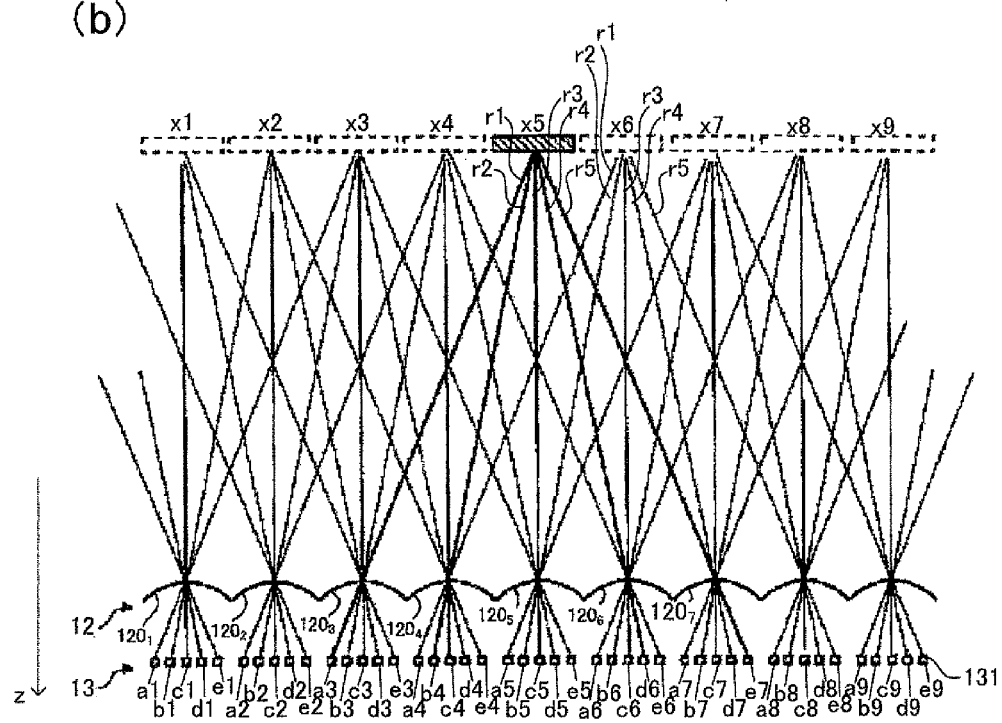

| VARIABLE PARAMETERS | SYMBOLS | CONTROL CHARACTERISTICS |
|---|---|---|
| INITIAL POSITION OF BLOCK IN MICROLENSES | U0, V0 (A REAL NUMBER VECTOR) | INITIAL VIEWPOINT POSITION OF VIEWPOINT IMAGES |
| NUMBERS OF TIMES OF BLOCK SHIFTING | Kx, Ky (POSITIVE NUMBERS) | NUMBER OF VIEWPOINTS OF VIEWPOINT IMAGES |
| AMOUNTS OF BLOCK SHIFTING | Sx, Sy (A REAL NUMBER VECTOR) | AMOUNT OF VIEWPOINT CHANGE BETWEEN VIEWPOINT IMAGES (PARALLAX) |
| BLOCK SHIFTING DIRECTION | ARCTAN(Sy/Sx) (A REAL NUMBER) | DIRECTION OF VIEWPOINT CHANGE OF VIEWPOINT IMAGES |
| NUMBER OF PIXELS IN BLOCKS | u, v (POSITIVE NUMBERS) | DEPTH OF PHOTOGRAPHIC SUBJECT FIELD OF VIEWPOINT IMAGES (F VALUE) |

(b)

| FIXED PARAMETERS | SYMBOLS |
|---|---|
| DIMENSIONS OF MICROLENS ARRAY, AND ARRAY PITCHES | ARRAY DIMENSION IN X AXIS DIRECTION: M; ARRAY DIMENSION IN Y AXIS DIRECTION: N PITCH IN X AXIS DIRECTION: P; PITCH IN Y AXIS DIRECTION: Q |
| NUMBER OF IMAGE CAPTURE PIXELS, AND ARRAY PITCHES | NUMBER OF PIXELS IN X AXIS DIRECTION: CX; NUMBER OF PIXELS IN Y AXIS DIRECTION: CY PITCH IN X AXIS DIRECTION: S; PITCH IN Y AXIS DIRECTION: T |
| RESOLUTION OF GENERATED IMAGE | X AXIS DIRECTION: M; Y AXIS DIRECTION: N |

FIG.9
(a)
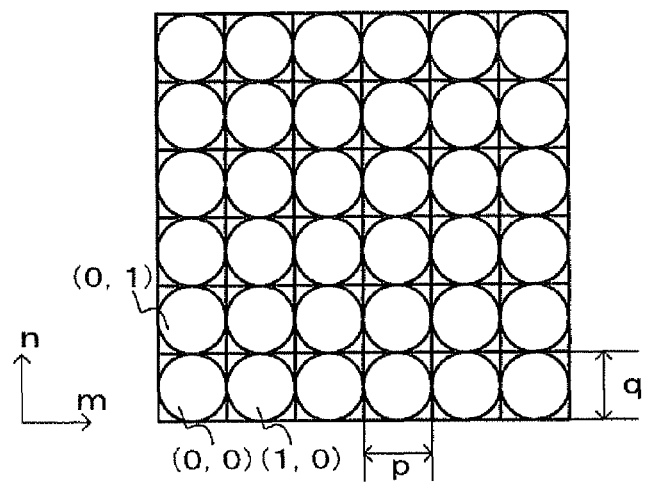
(b)
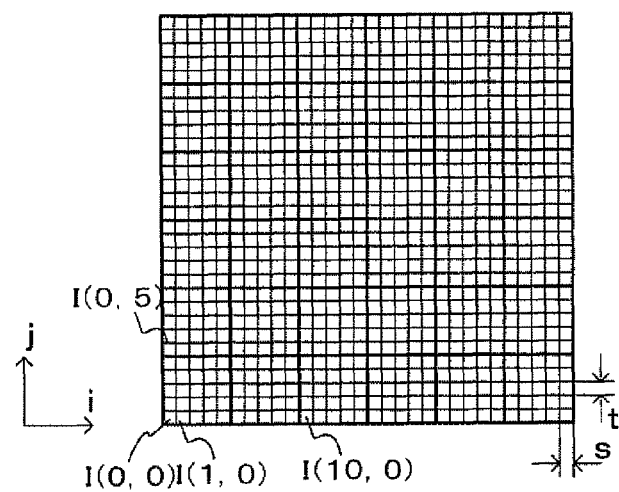

FIG.11
(a)
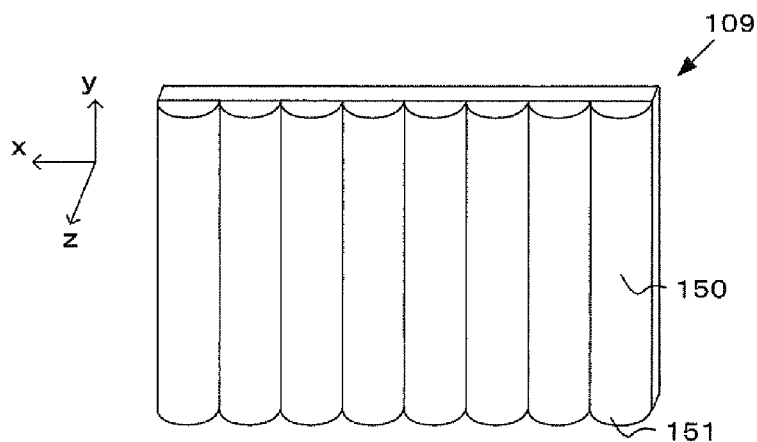
(b)
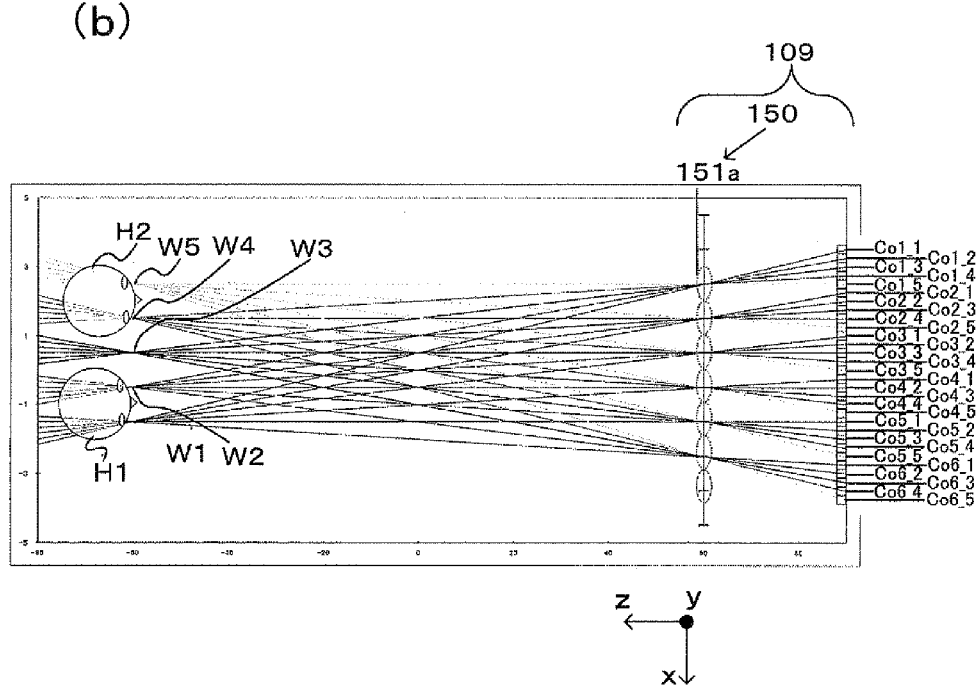

FIG.13
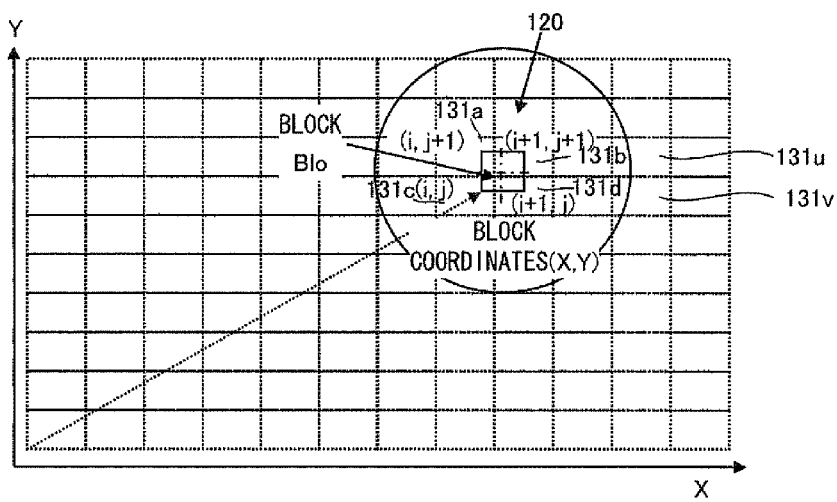
(a)
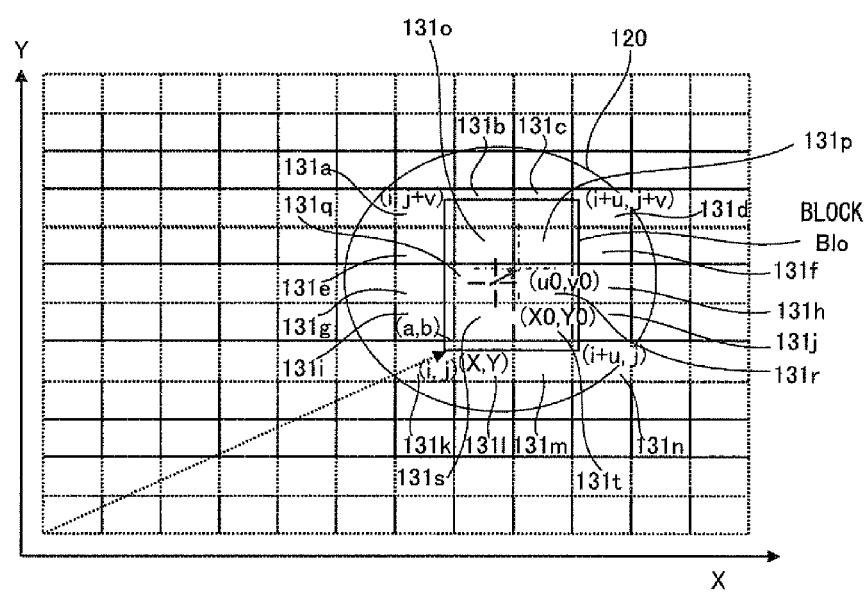
(b)
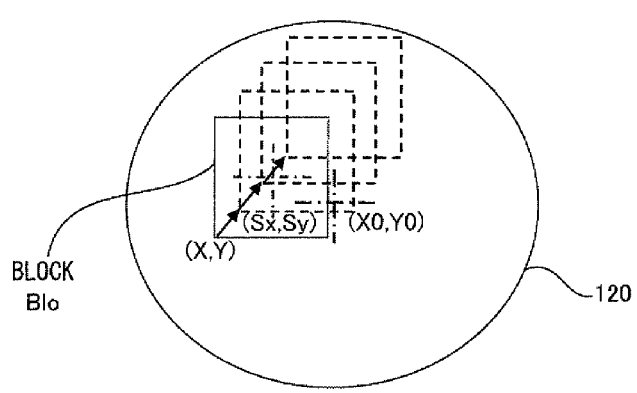
(c)

IMAGE CAPTURING DEVICE

TECHNICAL FIELD

The present invention relates to an image capturing device that generates a multiple viewpoint image.

BACKGROUND ART

From the past, it has been known that a stereo image capture device using two image capture optical systems captures a stereo image consisting of an image for the right eye and an image for the left eye (for example, refer to Patent Document #1). By employing an arrangement in which a predetermined spacing is provided between the two image capture optical systems, this type of stereo image capture device creates parallax between the two images that are obtained by capturing images of the same photographic subject.

Furthermore, an image capture device is known that synthesizes image data for an image upon any desired image surface (for example, refer to Patent Document #2). By extracting the outputs of predetermined photoelectric conversion elements from a pixel array that is disposed behind a set of microlenses that form a microlens array, this image capture device has a function of synthesizing image data in which the focal point is matched to a focal subject that is positioned at any desired photographic distance.

Patent document #1: Japanese Laid-Open Patent Publication Heisei 8-47001.

Patent document #2: Japanese Laid-Open Patent Publication 2007-4471.

SUMMARY OF INVENTION

Technical Problem

However there is the problem that it is not possible to create any desired number of images having parallax using a single photographic optical system.

Solution to Problem

According to the 1st aspect of the present invention, an image capture device comprises: a plurality of microlenses that are arranged in a two dimensional configuration in a vicinity of a focal plane of a photographic optical system; an image capture element in which a plurality of element groups are arranged in a two dimensional configuration so as respectively to correspond to the microlenses, each element group including a plurality of photoelectric conversion elements that receive via the microlenses light fluxes from a photographic subject that have passed through the photographic optical system and that output image signals; a generation unit that extracts, among the image signals outputted from the plurality of photoelectric conversion elements included in each of the plurality of element groups, a plurality of region image signals respectively corresponding to a plurality of different partial regions upon the pupil surface of the photographic optical system, and that generates, on the basis of the region image signals, a plurality of sets of image data as a plurality of sets of viewpoint image data whose viewpoint positions are different with each other, each of the plurality of sets of image data respectively corresponding to the partial regions; and a reception unit that receives a viewpoint number selection operation to select a number of viewpoints; wherein the generation unit generates the sets of viewpoint image data by extracting the region image signals so that a number of the region image signals is equal to a number of viewpoints selected by the number of viewpoints selection operation.

According to the 2nd aspect of the present invention, it is preferred that in the image capture device according to the 1st aspect, the generation unit generates one of the sets of viewpoint image data by combining together the region image signals that have been extracted from different ones of the element groups among the plurality of region image signals respectively extracted from the plurality of element groups, the different ones of the element groups corresponding to the single partial region.

According to the 3rd aspect of the present invention, it is preferred that the image capture device according to the 1st or 2nd aspect further comprises: a setting unit that sets extraction regions for extraction of the region image signals, and wherein: the setting unit sets the extraction regions whose number is equal to the number of viewpoints that have been selected, to different positions of the element groups; and the generation unit extracts the region image signal for each of the extraction regions set by the setting unit.

According to the 4th aspect of the present invention, it is preferred that in the image capture device according to the 3rd aspect, the reception unit receives parallax selection operation to select a parallax that specifies an amount of change of viewpoint between the plurality of sets of viewpoint image data; the setting unit sets the extraction regions at positional intervals that correspond to the parallax selected by the parallax selection operation; and the generation unit generates the sets of viewpoint image data by extracting the region image signal from each of the extraction regions that are positioned apart at the intervals.

According to the 5th aspect of the present invention, it is preferred that in the image capture device according to the 3rd or 4th aspect, the reception unit receives a depth selection operation to select the depth of photographic subject field of the image; the setting unit sets size of the extraction regions according to the depth of photographic subject field selected by the depth selection operation; and the generation unit generates the sets of viewpoint image data by combining the plurality of the image signals corresponding to the size of the extraction regions that has been set, and extracting the image signals as a single region image signal.

According to the 6th aspect of the present invention, it is preferred that in the image capture device according to any one of the 3rd through 5th aspects, the reception unit further receives a viewpoint position selection operation to change the viewpoint positions in a direction in two dimensions; the setting unit sets a direction for extraction of the extraction regions whose number is equal to the number of viewpoints, according to the viewpoint position selection operation; and the generation unit generates the sets of viewpoint image data by extracting the region image signals along the direction set by the setting unit.

According to the 7th aspect of the present invention, it is preferred that in the image capture device according to any one of the 3rd through 6th aspects, if the extraction region set by the setting unit overlaps a portion of one photoelectric conversion element, the generation unit performs weighting upon the image signal outputted from that overlapped photoelectric conversion element according to proportion of overlapping, and extracts the region image signal.

According to the 8th aspect of the present invention, it is preferred that the image capture device according to any one of the 3rd through 7th aspects further comprises: an attitude determination unit that detects the attitude of the image capture device, and wherein: the setting unit sets the direction for extraction of the extraction regions whose number is equal to the number of viewpoints, so that the positions of the viewpoints differ according to the attitude detected by the attitude determination unit; and the generation unit generates the viewpoint image data by extracting the region image signals along the direction set by the setting unit.

According to the 9th aspect of the present invention, the image capture device according to any one of the 1st through 8th aspects may further comprise: a display control unit that generates image data for display on the basis of a plurality of the sets of viewpoint image data generated by the generation unit, and that displays an image corresponding to the image data for display as a three dimensional image upon a display device.

Advantageous Effect of the Invention

According to the present invention, it is possible to generate the same number of sets of viewpoint image data as a number of viewpoints that has been selected by an operation for number of viewpoints selection.

BRIEF DESCRIPTION OF THE DRAWINGS

FIG. 2 is a figure showing an example of arrangement of microlenses and an image capture element: FIG. 2(a) is a figure showing the arrangement of the microlenses in the XY plane, FIG. 2(b) is a figure showing the positional relationship between a photographic lens, the microlenses, and the image capture element in the direction of the optical axis, and FIG. 2(c) is a figure showing the arrangement of image capture pixels in one pixel array;

FIG. 3 is a figure for explanation of the relationship between a block size and a number of viewpoints: FIG. 3(a) is a figure showing the arrangement of the image capture pixels in one pixel array, and FIG. 3(b) is a figure showing an example of the image data that is generated for five viewpoints;

FIG. 4 is a figure for explanation of the relationship between the size of the blocks and the number of viewpoints: FIG. 4(a) is a figure showing the relationship between the image capture pixels in one pixel array and the blocks, and FIG. 4(b) is a figure showing an example of the image data that is generated for four viewpoints;

FIG. 5 is a figure for explanation of the theory when parallax does not occur in a multiple viewpoint image: FIG. 5(a) is a figure showing light fluxes when five viewpoint images are generated, FIG. 5(b) is a figure in which the vicinity of the focal plane in FIG. 5(a) is enlarged, and FIG. 5(c) is a figure in which the vicinity of the microlens array and the image capture element in FIG. 5(b) is enlarged;

FIG. 6 is a figure for explanation of the theory when parallax does not occur in a multiple viewpoint image: FIG. 6(a) shows viewpoint images that correspond to sets of viewpoint image data, and FIG. 6(b) shows the situation with light fluxes that are incident upon the image capture element;

FIG. 7 is a figure for explanation of the theory when parallax does occur in a multiple viewpoint image: FIG. 7(a) shows a viewpoint image corresponding to viewpoint image data, and FIG. 7(b) shows the state of a light flux that is incident upon the image capture element;

FIG. 8 is a figure showing an example of variable parameters and fixed parameters: FIG. 8(a) shows variable parameters and characteristics that can be controlled according to variable parameters, and FIG. 8(b) shows an example of fixed parameters;

FIG. 9 is a figure for explanation of calculation processing when generating a multiple viewpoint image: FIG. 9(a) shows the coordinate system of the microlenses in the XY plane, and FIG. 9(b) shows the coordinate system of the image capture element in the XY plane;

FIG. 11 is a figure showing an example of the structure of a display device of a digital camera of an embodiment: FIG. 11(a) shows an example of the structure of a lenticular lens, and FIG. 11(b) shows the relationship between the display device and the light fluxes in the XZ plane;

FIG. 13 is a figure for explanation of an example of the arrangement of microlenses and an image capture element in a second embodiment: FIG. 13(a) shows the arrangement of the microlenses and the image capture element in the XY plane, FIG. 13(b) shows the arrangement of the microlenses and the image capture element in the XY plane when the blocks are generalized, and FIG. 13(c) schematically shows the way in which a block shifts according to the results of calculation;

DESCRIPTION OF EMBODIMENT

Embodiment 1

The digital camera of this embodiment is adapted to be capable of creating a number of images having a plurality of viewpoints (i.e. parallaxes) for a single photographic field. When the desired number of viewpoints, the parallax, the direction of viewpoint change, the depth of subject field and so on have been selected by the user, then this digital camera is able to create a multiple viewpoint image corresponding to these selections by the user. In the following, this will be explained in detail.

Figure 1:
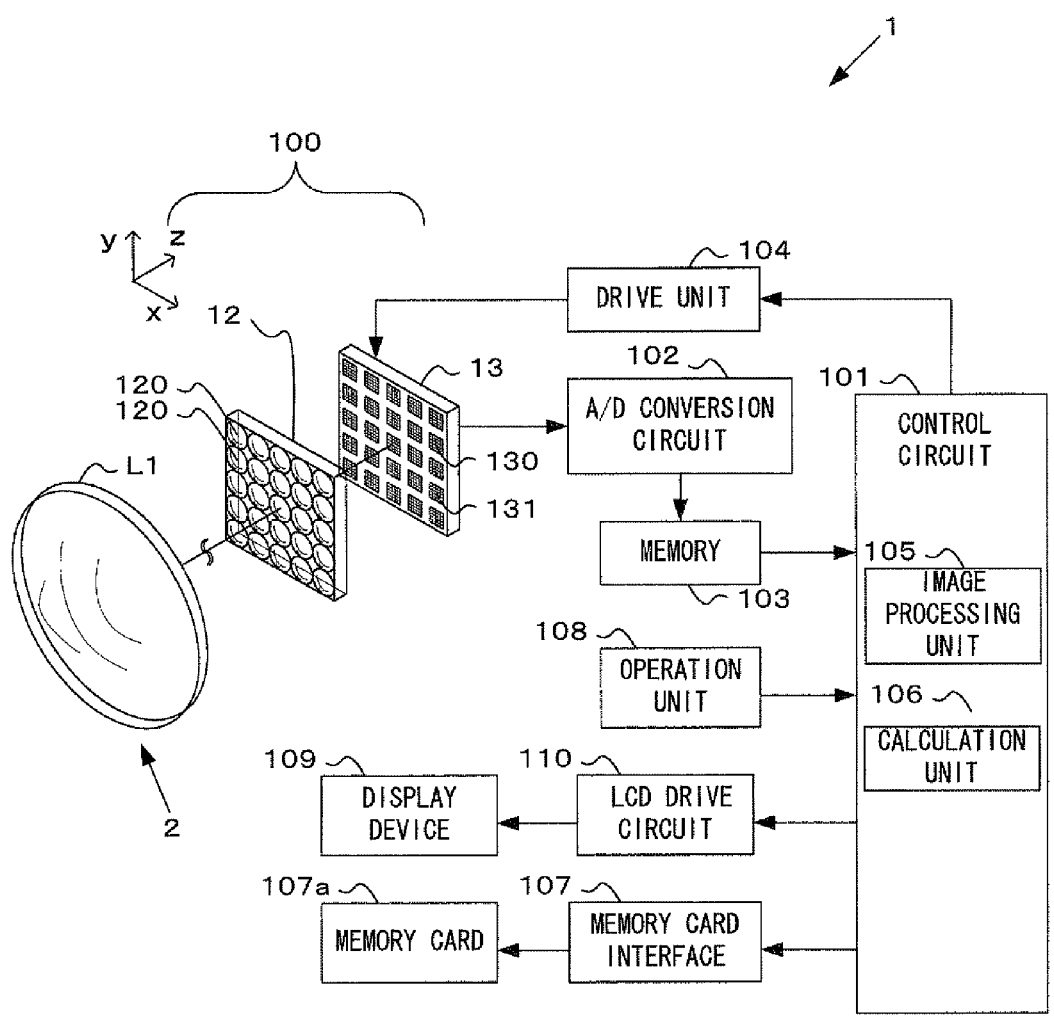
FIG. 1 is a figure for explanation of the structure of a digital camera according to an embodiment of the present invention.

FIG. 1 is a figure for explanation of the structure of a digital camera according to the first embodiment. This digital camera 1 includes an interchangeable lens 2 having a photographic lens L1. And the digital camera 1 includes an image capture unit 100, a control circuit 101, an A/D conversion circuit 102, a memory 103, a drive unit 104, a memory card interface 107, an operation unit 108, a display device 109, and an LCD drive circuit 110. The image capture unit 100 includes a microlens array 12 in which a large number of microlenses 120 are arranged in a two dimensional configuration, and an image capture element 13. It should be understood that, in FIG. 1, the Z axis is set so as to be parallel to the optical axis of the photographic lens L1, while the X axis and the Y axis are set in directions that are mutually orthogonal and that lie in a plane orthogonal to the Z axis.

The photographic lens L1 consists of a plurality of groups of optical lenses, and images a light flux from a photographic subject in the vicinity of its focal plane. It should be understood that in FIG. 1, as a representative for the convenience of explanation, the photographic lens L1 is shown as being a single lens. The microlens array 12 and the image capture element 13 are arranged in order in the vicinity of the focal plane of the photographic lens L1. The image capture element 13 is built as a CCD or CMOS image sensor that includes a plurality of photoelectric conversion elements. The image capture element 13 captures an image of the photographic subject that is being imaged upon its image capture surface, and, under control by the drive unit 104, outputs a photoelectric conversion signal corresponding to this image of the photographic subject (i.e. an image signal) to the A/D conversion circuit 102. It should be understood that an explanation of the details of the image capture unit 100 will be given hereinafter. The drive unit 104 outputs a timing signal to the image capture element 13 according to a command from the control circuit 101, and thus controls the operational timing of the image capture element 13.

The A/D conversion circuit 102 is a circuit that converts the image signal outputted by the image capture element 13 to a digital image signal, after having performed analog processing thereupon. And, on the basis of a control program, the control circuit 101 performs predetermined calculation using signals inputted from various sections that make up the digital camera 1, outputs control signals to various sections of the camera 1, and controls photographic operation. Functionally, the control circuit 101 includes an image processing unit 105 and a calculation unit 106. The image processing unit 105 performs various types of image processing upon the image signal that has been converted to digital by the A/D conversion circuit 102, and generates image data. And the image processing unit 105 performs JPEG compression processing upon this image data that it has generated, and records the result upon a memory card 107a in a format such as EXIF or the like. Moreover, the calculation unit 106 performs various types of calculation processing for the image processing performed by the image processing unit 105 described above.

The memory 103 is a volatile storage medium that is used for temporarily storing the image signal that has been converted to digital by the A/D conversion circuit 102 and data during the image processing, the image compression processing, and the processing to create the image data for display, and the data after processing. The memory card interface 107 is an interface into which the memory card 107a can be fitted and from which it can be removed. This memory card interface 107 is an interface circuit that writes image data upon the memory card 107a and reads out image data recorded on the memory card 107, according to control by the control circuit 101. The memory card 107a is a semiconductor memory card such as a compact flash card (registered trademark) or an SD card.

The LCD drive circuit 110 is a circuit that drives the display device 109 on the basis of commands from the control circuit 101. This display device 109 may, for example, include a liquid crystal or the like, and, in a reproduction mode, displays display data that has been created by the control circuit 101 on the basis of image data recorded upon the memory card 107a. Moreover, the display device 109 displays menu screens for various types of operation for setting the digital camera 1. An explanation of the details of the LCD drive circuit 110 and the display device 109 will be given hereinafter.

The operation unit 108 receives actuation by the user, and outputs various types of operating signal to the control circuit 101 according to the details of that actuation. This operation unit 108 includes a power supply button, a release button, a mode selection button, a display changeover button for other menu settings, a setting menu confirm button, and so on. The mode selection button is used when performing operation for changing over the operation of the digital camera 1 between photographic modes and the reproduction mode. Moreover, as a photographic mode, the digital camera 1 includes a multiple viewpoint image creation mode for photographing an image from a plural number of viewpoints (i.e., a multiple viewpoint image). In this multiple viewpoint image creation mode, it is arranged for it to be possible to select viewpoint conditions such as the number of viewpoints, their parallax, the direction of change of the viewpoints, the depth of the photographic subject field, and so on for the image to be photographed by the user. Selection of the viewpoint conditions in the multiple viewpoint image creation mode is performed from the menu screen described above by operating the operation unit 108.

Next, the details of the structure of the image capture unit 100 will be explained. As described above, this image capture unit 100 includes the microlens array 12 and the image capture element 13. The microlens array 12 consists of a plurality of microlenses 120 arranged in a two dimensional configuration. In the image capture element 13, pixel arrays 130 that receive light that has passed through the microlenses 120 described above are arranged in a configuration pattern that corresponds to the microlenses 120. Each of the pixel arrays 130 consists of a plurality of photoelectric conversion elements 131 (hereinafter termed "image capture pixels 131") that are arranged in a two dimensional configuration.

One example of a configuration of the microlenses 120 and the image capture element 13 is shown in FIG. 2. FIG. 2(a) is a figure for explanation of an example of arrangement of the microlenses 120 and the image capture pixels 131 of the image capture element 13 in directions orthogonal to the direction of the optical axis of the photographic lens L1 (i.e. in the XY plane). In the microlens array 12 shown in FIG. 2(a), six microlenses 120 are arrayed in the X axis direction and six microlenses 120 are arrayed in the Y axis direction, in other words 6×6 microlenses 120 are arrayed altogether. One of the pixel arrays 130 is provided to correspond to each one of the microlenses 120. Each of the pixel arrays 130 may, for example, include five image capture pixels 131 in the X axis direction and five image capture pixels 131 in the Y axis direction, in other words to include 5×5 image capture pixels 131 altogether. In other words, 5×5 image capture pixels 131 are provided for one microlens 120. As a result, in this embodiment, the image capture element 13 has 30×30 image capture pixels 131.

FIG. 2(b) is a figure for explanation of the positional relationship between the photographic lens L1, the microlenses 120, and the image capture element 13 in the direction of the optical axis of the photographic lens L1 (i.e. in the Z axis direction). As shown in FIG. 2(b), the microlenses 120 are arranged at the position of the focal point of the photographic lens L1 where the image of the photographic subject (i.e. of the object surface) is created (i.e. the focusing surface), in other words at the conjugate position to the object surface. The image capture element 13 is arranged at a position separated from the microlenses 120 by just their focal length. As a result, the image capture surface of the image capture element 13 is conjugate to the photographic lens L1. It should be understood that FIG. 2(b) shows a case in which the focal point of the photographic lens L1 is matched to the object surface, in other words in which the light flus from the photographic lens L1 is imaged upon the microlenses 120.

In FIG. 2(b), the region occupied by the image projected upon the pupil surface of the photographic lens L1 due to the microlens 120 that corresponds to the image capture pixel 131ai is the partial region P1 upon the pupil of the photographic lens L1. In a similar manner to the partial region P1, the partial regions P2, P3, . . . correspond to the image capture pixels 131bi, 131ci, . . . . The light fluxes r1, r2, r3, . . . that have passed through the partial regions P1, P2, P3, . . . upon the pupil of the photographic lens L1 pass through the microlens and are respectively incident upon the image capture pixels 131ai, 131bi, 131ci, . . . . It should be understood that while, in FIG. 2(b), the light fluxes r1 through r5 that are incident upon the microlens 120 that is disposed upon the optical axis of the photographic lens L1 are shown as representatives, in a similar manner light fluxes r1 through r5 are also incident upon the microlens 120 that are provided in positions away from the optical axis, and are transmitted to corresponding image capture pixels 131. Furthermore, actually the partial regions P1, P2, . . . P5 are arranged in a two dimensional configuration, in other words are also present along the Y axis direction, but here they are only shown as being arranged along the X axis direction, in order to simplify the explanation.

FIG. 2(c) shows the positional relationship of the image capture pixels 131ai through 131di in one of the pixel arrays 130i. It should be understood that since the partial regions P1 through P5 are shown as being arranged along the X axis by way of example in FIG. 2(b), accordingly the light fluxes r1 through r5 are also respectively incident upon the image capture pixels 131ai through 131di that are arranged along the X axis direction. And the image capture pixels 131ai, 131bi, 131ci, . . . respectively output the image signals ai, bi, ci, . . . .

Processing is performed by the image processing unit 105 of the digital camera 1 for generating a multiple viewpoint (multiple parallax) image, using the image signals outputted from the image capture unit 100 having the structure described above. Moreover, the LCD drive circuit 110 and the display device 109 of the digital camera 1 of this embodiment are adapted to be able to display the multiple viewpoint (multiple parallax) image that has been generated as a three dimensional image (i.e. as a 3D image. In the following, (A) the theory of generation of a multiple viewpoint (multiple parallax) image, (B) the theory of occurrence of parallax in a multiple viewpoint image, (C) the processing for generation of a multiple viewpoint image, and (D) three dimensional display, will be explained.

(A) The Theory of Generation of a Multiple Viewpoint (Multiple Parallax) Image

The positions and the directions of the light fluxes from the photographic subject are each detected independently by using the image signals outputted from the image capture pixels that are included in the image capture unit 100. The positions of the light fluxes from the photographic subject can be detected in accordance with the number of the microlenses 120. Due to this, the number of pixels in the image data that is generated on the basis of the image signals, in other words the resolution, comes to be limited by the number of the microlenses 120. As shown in FIG. 2(a), if the microlens array 12 has 6×6 microlenses 120, then the resolution of the image data is 36 (=6×6).

The directions of the viewpoints are detected in accordance with the number of image capture pixels 131 that are provided to correspond to one microlens 120. As described above, since the pupil surface of the photographic lens L1 and the image capture surface of the image capture element 13 are conjugate, accordingly the pupil surface of the photographic lens L1 comes to be divided up into the same number of partial regions P as the number of image capture pixels 131 that are included in one pixel array 130. The image processing unit 105 generates image data for each image signal corresponding to the light fluxes "r" that have passed through each of these partial regions P. As a result, the image processing unit 105 generates the same number of sets of image data with viewpoints upon the same photographic subject as the number of different partial regions P, in other words as the number of image capture pixels 131 that are included in one pixel array 130. If 5×5 image capture pixels 131 are provided for one microlens 120 as in the case shown in FIG. 2(a), then the image processing unit 105 generates 5×5 items of image data whose viewpoints are different, since 5×5 viewpoints can be detected.

Furthermore, the image processing unit 105 divides the region that is specified by one pixel array 130 into a plurality of extraction regions (these may, for example, be rectangular regions), and generates image data using the pixel signals outputted from the plurality of image capture pixels 131 included in these extraction regions. In this case, the image processing unit 105 generates image data for the same number of viewpoints as the number of extraction regions. To put it in another manner, the pupil surface of the photographic lens L1 comes to be divided up into the same number of partial regions P as the number of extraction regions, and the image processing unit 105 generates image data for each image signal corresponding to a light flux "r" that has passed through one of these partial regions P. It should be understood that, in the following explanation, these extraction regions will be termed "blocks". Furthermore, it will be supposed that it is arranged for it to be possible for the size of the blocks to be set by the user upon a menu screen by performing selection processing and setting processing using the operation unit 108. An explanation of the details of this setting processing will be given hereinafter.

The relationship between the size of the blocks and the number of viewpoints will now be explained using FIG. 3. FIG. 3 shows a case in which the size of the blocks Blo has been set by the user to 1, in other words a case in which one image capture pixel 131 is included in one block Blo. It should be understood that, in FIG. 3, for the convenience of explanation, only the number of viewpoints in the X axis direction is shown. FIG. 3(a) shows one pixel array 130i among the plurality of pixel arrays 130 included in the image capture element 13, as one example.

In this case, from among the image signals outputted from the image capture element 13, the image processing unit 105 extracts the image signal ai outputted from the image capture pixel 131ai included in the pixel array 130i shown in FIG. 3(a). Moreover, the image processing unit 105 extracts the image signal "a" outputted from each of the image capture pixels 131a of all of the pixel arrays 130 included in the image capture element 13. And the image processing unit 105 generates a single item of image data Im_a using all of the image signals "a" that have thus been extracted. In a similar manner, the image processing unit 105 generates items of image data Im_b, . . . Im_e by using the image signals "b", . . . "e" outputted from each of the image capture pixels 13b, . . . 131e included in the pixel arrays 130. As a result, as shown in FIG. 3(b), the image processing unit 105 generates five items of image data Im_a, . . . Im_b, . . . Im_e (from five viewpoints).

The relationship between the size of the blocks Blo and the number of viewpoints will now be explained using FIG. 4. FIG. 4(a) shows a case in which the size of the blocks Blo has been set by the user to 2×3, in other words, a case in which there are 6 (=2×3) image capture pixels 131 in one block Blo. It should be understood that for the convenience of explanation, in the same way in FIG. 4 as in FIG. 3, only the number of viewpoints in the X axis direction is shown. FIG. 4(a) shows one pixel array 130i among the plurality of pixel arrays 130 included in the image capture element 13 as an example. Moreover, the blocks Blo_bi (the region shown by vertical lines in FIG. 4(a)), Blo_ci (the dotted region in FIG. 4(a)), and Blo_di (the region shown by horizontal lines in FIG. 4(a)) are the block Blo_ai (the region shown by slanting lines in FIG. 4(a)), shifted one pixel at a time sequentially in the X axis direction.

In this case, from among the image signals outputted from the image capture element 13, the image processing unit 15 adds together the image signals outputted from the 6 (=2×3) image capture pixels that are included in the block Blo_ai of the pixel array 130i, and extracts the one image signal ai. Furthermore, the image processing unit 105 extracts the image signals "a" outputted from the image capture pixels 131 within each of the blocks Blo_a of all of the pixel arrays that are included in the image capture element 13. And the image processing unit 105 generates one item of image data Im_a using all of the image signals "a" that have been extracted. In a similar manner, the image processing unit 105 also performs similar processing upon the outputs from the image capture pixels within each of the blocks Blo_b, . . . Blo_d that are included in the pixel arrays 130, and generates items of image data Im_b, . . . Im_d. As a result, as shown in FIG. 4(b), the image processing unit generates four items of image data Im_a, Im_b, . . . Im_d for four viewpoints.

Since the pupil surface of the photographic lens L1 is divided up into the same number of partial regions P as the number of blocks Blo as described above, accordingly the size of the partial regions P of the photographic lens L1 is determined according to the size that is set for the blocks Blo. Due to this, the pixels of the image capture element 13 (in other words the size of the blocks Blo) come to regulate the size of the partial regions P of the photographic lens L1 that is in a conjugate relationship with the image capture element 13, in other words the size (i.e. the diameter) of the light fulxes. Accordingly, the size that has been set for the blocks Blo comes to correspond to the F value of the photographic lens L1, and, the smaller is the size of the blocks Blo, the larger is the F value.

As was explained using FIG. 3, if the size of the blocks Blo is set to 1, then the image processing unit 105 generates five sets of image data Im_a through Im_e on the basis of the image signal outputted from one image capture pixel 131 for one microlens 120. Thus, since the F value becomes great if the size of the blocks Blo is set to 1, accordingly the depth of the photographic subject field of the image that corresponds to each of these items of image data Im_a through Im_e that have been generated becomes deep.

As has been explained using FIG. 4, if the size of the blocks Blo is set to 2×3, then the image processing unit 105 generates image data on the basis of the image signals outputted from six image capture pixels 131 for one microlens 120. Since in this case the partial regions P of the photographic lens L1 have size six times that of the partial regions P of the photographic lens L1 in the case of FIG. 3, accordingly the light fluxes that are incident upon the image capture pixels 131 within the blocks Blo come to have six times the size (i.e., diameter). Therefore, since the F value becomes smaller when the size of the blocks Blo is set to 2×3, accordingly the depth of the photographic field of the images that respectively correspond to the items of image data Im_a through Im_d that have been generated becomes shallow. As a result, by the size of the blocks Blo being set to be great, the digital camera 1 of this embodiment generates a similar image as an image that is photographed using a normal type single lens reflex camera or the like, in which the focus is adjusted only to the main photographic subject, so that the background and the foreground are somewhat blurred.

It should be understood that while, in the above explanation, the direction of shifting of the viewpoint was explained as being the X axis direction, it would also be acceptable for the viewpoint to shift in the Y axis direction, or for it to shift in two different directions upon the XY plane. Moreover, the shape of the blocks Blo is not to be considered as being limited to rectangular.

(B) The Theory of Occurrence of Parallax in a Multiple Viewpoint Image

The cases will now be explained in which parallax is to occur, and is not to occur, between the images from a plurality of viewpoints that have been generated as described above. First, using FIG. 5, the case will be explained in which parallax is not to occur between the images from a plurality of viewpoints. FIG. 5(a) is a figure for explanation of light fluxes r1 through r5 at the image capture side when five viewpoint images are generated. And FIG. 5(b) is a figure showing in magnified form, among the light fluxes r1 through r5 shown in FIG. 5(a), the light fluxes r1 through r5 in the vicinity of the focal plane (the image focusing surface) of the photographic lens L1. Moreover, FIG. 5(c) is a figure showing in magnified form, among the light fluxes r1 through r5 shown in FIG. 5(b), the light fluxes in the vicinity of the microlens array 12 and the image capture element 13.

In FIG. 5, the positions of the five viewpoints are the same as the image capture pixels 131ai through 131ei shown in FIGS. 2 through 4. As shown in FIG. 5(a), the light beams incident upon each of the image capture pixels 131ai through 131ei provided to correspond to one microlens 120 intersect one another at the same point upon the object surface Q1. Accordingly, for a photographic subject that is present at the object surface Q1, no parallax occurs between the images that correspond to each of the sets of viewpoint image data Im_a through Im_e. By contrast, the light fluxes r1 through r5 that intersect upon a surface Q2 that is remote from the object surface Q1 are conducted to different ones of the microlenses 120. Accordingly, for a photographic subject that is present upon the surface Q2 that is remote from the object surface Q1, parallax occurs between the images that correspond to each of the sets of viewpoint image data Im_a through Im_e. In the following, the case in which parallax occurs and the case in which parallax does not occur will be explained in detail.

—When Parallax does not Occur—

The case in which parallax does not occur between the plurality of viewpoint images will now be explained with reference to FIG. 6. FIG. 6(a) shows viewpoint images Ai through Ei corresponding to five sets of viewpoint image data Im_a through Im_e generated by photography of an image of a photographic subject "A" imaged upon the focal plane. In other words, the viewpoint images Ai through Ei respectively correspond to the image signals outputted from the image capture pixels 131ai through 131ei. And FIG. 6(b) shows the situation with the light fluxes that are incident upon the image capture element 13. In FIG. 6(b), the direction perpendicular to the drawing paper is taken as being the Z axis direction, and Z=0 is set to the plane of the microlenses 120, in other words to the focal plane. The positions of the images of the photographic subject "A" imaged upon the focal plane (Z=0) are given by X1 through X9.

The light fluxes r1 through r5 that form the image imaged at the position X5 are incident via the microlens $120_5$ upon the image capture pixels 131a5 through 131e5 respectively. Moreover, the light fluxes r1 through r5 that form the image imaged at the position X6 are incident via the microlens $120_6$ upon the image capture pixels 131a6 through 131e6 respectively. In other words, the image capture pixels 131a1, 131a2, 131a3, . . . upon the image capture element 13 receive the light flux r1 and output image signals. As a result, the image capture pixels 131a1, 131a2, . . . come to capture the images at the positions X1, X2, . . . .

In a similar manner, the image capture pixels 131b1, 131b2, . . . receive the light flux r2, the image capture pixels 131c1, 131c2, . . . receive the light flux r3, the image capture pixels 131d1, 131d2, . . . receive the light flux r4, and the image capture pixels 131e1, 131e2, . . . receive the light flux r5. As a result, the image captured by the image capture pixels 131a1, 131a2, . . . , the image captured by the image capture pixels 131b1, 131b2, . . . , the image captured by the image capture pixels 131c1, 131c2, . . . , the image captured by the image capture pixels 131d1, 131d2, . . . , and the image captured by the image capture pixels 131e1, 131e2, . . . become the images at all the positions X1, X2, . . . . Accordingly, as shown in FIG. 6(a), no parallax occurs, since the five viewpoint images Ai through Ei generated on the basis of the respective image signals outputted from the image capture pixels 131ai through 131ei become the same image.

—When Parallax Occurs—

The case in which parallax occurs between the plurality of viewpoint images will now be explained with reference to FIG. 7. FIG. 7(a) shows five viewpoint images Ai through Ei generated by photography of an image of a photographic subject "A" imaged upon a surface that is different from the focal plane. In a similar manner to the case with FIG. 6(a), the viewpoint images Ai through Ei respectively correspond to the image signals outputted from the image capture pixels 131ai through 131ei. And FIG. 7(b) shows the situation with the light fluxes that are incident upon the image capture element 13. In FIG. 7(b) as well, the direction perpendicular to the drawing paper is taken as being the Z axis direction, and Z=0 is set to the plane of the microlenses 120, in other words to the focal plane. The positions of the images of the photographic subject "A" imaged upon the plane (Z=h1) that is different from the focal plane are given by X1 through X9.

The light flux r1 among the light fluxes r1 through r5 that form the image imaged at the position X5 is incident via the microlens $120_3$ upon the image capture pixel 131a3. Moreover, the light flux r2 is incident via the microlens $120_4$ upon the image capture pixel 131b4, the light flux r3 is incident via the microlens $120_5$ upon the image capture pixel 131c5, the light flux r4 is incident via the microlens $120_6$ upon the image capture pixel 131d6, and the light flux r5 is incident via the microlens $120_7$ upon the image capture pixel 131e7. In a similar manner, the light flux r1 among the light fluxes r1 through r5 that form the image imaged at the position X6 is incident upon the image capture pixel 131a4, the light flux r2 is incident upon the image capture pixel 131b5, the light flux r3 is incident upon the image capture pixel 131c6, the light flux r4 is incident upon the image capture pixel 131d7, and the light flux r5 is incident upon the image capture pixel 131e8. As a result, each of the light fluxes r1 through r5 that form the images imaged at different positions is incident upon the image capture element 13 via a different microlens 120.

Accordingly, the image capture pixels 131a1, 131a2, 131a3, . . . upon the image capture element 13 receive the light flux r1 and output image signals. In other words, the image capture pixels 131a1, 131a2, 131a3, . . . come to capture images of the positions X3, X4, X5, . . . . Moreover, since the image capture pixels 131b1, 131b2, 131b3, . . . upon the image capture element 13 receive the light flux r2, accordingly they come to capture images of the positions X2, X3, X4, . . . . In a similar manner, the image capture pixels 131c1, 131c2, 131c3, . . . receive the light flux r3 and capture images of the positions X1, X2, X3, . . . , the image capture pixels 131d1, 131d2, 131d3, . . . receive the light flux r4 and capture images of the positions X0 (not shown in the figure), X1, X2, . . . , and the image capture pixels 131e1, 1311e2, 1311e3, . . . receive the light flux r5 and capture images of the positions X(−1) (not shown in the figure), X0 (not shown in the figure), X1, . . . .

As a result, the position of the image captured by the image capture pixels 131a1, 131a2, . . . , the position of the image captured by the image capture pixels 131b1, 131b2, . . . , the position of the image captured by the image capture pixels 131c1, 131c2, . . . , the position of the image captured by the image capture pixels 131d1, 131d2, . . . , and the position of the image captured by the image capture pixels 131e1, 131e2, . . . come to be slightly staggered apart from one another along the X axis direction. Accordingly, as shown in FIG. 7(a), parallax occurs between the five viewpoint images Ai through Ei that are generated on the basis of the image signals respectively outputted from the image capture pixels 131ai through 131ei, since they are not the same image. Due to the above operation, parallax appears to be present between the plurality of viewpoint images for which the depth of the object surface with respect to the digital camera, in other words distance information, has been acquired. As will be described hereinafter, this parallax can be dealt with as three dimensional information by a display element that is capable of three dimensional display.

(C) Processing for Generating a Multiple Viewpoint Image

In the following, the operation of this digital camera 1 according to the first embodiment when performing processing to generate a multiple viewpoint (multiple parallax) image, in other words when the multiple viewpoint image creation mode has been set, will be explained. It should be understood that this multiple viewpoint image creation mode is set by the control circuit 101 when the multiple viewpoint image creation mode is selected according to operation of the mode selection button by the user, and an actuation signal is inputted from the operation unit 108.

In the multiple viewpoint image creation mode, as described above, it is arranged for it to be possible for the user to select characteristics of the viewpoint images (i.e., of the three dimensional image), in other words viewpoint conditions. The direction of change of viewpoint, the number of viewpoints, the amount of change of viewpoint, and the number of pixels of viewpoint generation (i.e. the size of the blocks Blo) are characteristics that can be selected. The user sets these characteristics using the operation unit 108, by performing selection operation upon a menu screen that is displayed upon the display device 109 described above. And the calculation unit 106 takes parameters corresponding to the characteristics described above as variable parameters to be used in the calculation processing when generating the viewpoint image data.

FIG. 8(a) shows variable parameters of various types, and the characteristics that can be controlled by these variable parameters. The "numbers "u", "v" of pixels in the blocks (i.e. of the image capture pixels 131)" shown in FIG. 8(a) are variable parameters for determining the size of the blocks Blo, and, as described above, the depth of the photographic subject field of the viewpoint images is determined according to the number of pixels within each block Blo that is set. It should be understood that "u" specifies the number of pixels in the blocks Blo in the X axis direction, while "v" specifies the number of pixels in the blocks Blo in the Y axis direction.

The "numbers Kx, Ky of times of block shifting" are variable parameters for determining the number of viewpoints in the multiple viewpoint image. The image processing unit 105 sets the same number of different blocks Blo upon the pixel array 130 as the numbers Kx, Ky that are set, and extracts the image signals from the image capture pixels 131 that are included in each of the blocks Blo. If the block Blo is shifted five times as shown in FIGS. 3 and 4, then images having five viewpoints are generated, while, if the block Blo is shifted four times, then images having four viewpoints are generated.

The "amounts Sx, Sy of block shifting" are variable parameters for determining the amounts of change of viewpoint between the plurality of viewpoint images. The greater the amounts of shifting of the blocks Blo are, the greater the parallax that occurs between the viewpoint images becomes. The image processing unit 105 extracts image signals from blocks Blo that are disposed upon the pixel array 130 at gaps positioned according to these shift amounts Sx, Sy that have been set. The "block shifting direction arctan(Sy/Sx)" is a variable parameter for determining the direction of viewpoint change between the viewpoint images. The image processing unit 105 extracts image signals from blocks Blo set upon the pixel array 130 along the shift direction that is selected. In the examples explained in FIGS. 3 and 4, cases are shown in which the shift direction is the X axis direction. And the "initial position U0, V0 of the block" is a variable parameter for determining the position of the initial viewpoint of the viewpoint images.

Moreover, as shown in FIG. 8(b), the dimensions M and N of the array of microlenses 120 and their pitches p and q, the numbers Cx and Cy of the pixels in the image capture element 13 (i.e. of the image capture pixels 131) and their pitches s and t, and the resolutions M and N of the image to be generated are set as fixed parameters. These fixed parameters are values that are determined in dependence upon the construction of the microlenses 120 and the image capture element 13.

When generating the five viewpoint images shown in FIG. 3 (five viewpoints along the X axis direction), the values of the above described variable parameters and fixed parameters are as follows.
Number M of microlenses 120 in the microlens array in the X axis direction=6
Number N of microlenses 120 in the microlens array in the Y axis direction=6
Number of pixels Cx of the image capture element 13 in the X axis direction=30
Number of pixels Cy of the image capture element 13 in the Y axis direction=30
Initial position of block: U0=0, V0=0
Numbers of times block is shifted: Kx=5, Ky=1
Amounts block is shifted: Sx=1, Sy=0
Numbers of pixels in block: u=1, v=1
It should be understood that, in this case, the resolution of the viewpoint images is 36 (=6×6=M×N).

When generating the four viewpoint images shown in FIG. 4 (four viewpoints along the horizontal direction), the values of the above described variable parameters and fixed parameters are as follows.
Number M of microlenses 120 in the microlens array in the X axis direction=6
Number N of microlenses 120 in the microlens array in the Y axis direction=6
Number of pixels Cx of the image capture element 13 in the X axis direction=30
Number of pixels Cy of the image capture element 13 in the Y axis direction=30
Initial position of block: U0=0, V0=0
Numbers of times block is shifted: Kx=4, Ky=1
Amounts block is shifted: Sx=1, Sy=0
Numbers of pixels in block: u==2, v=3
It should be understood that, in this case, the resolution of the viewpoint images is 36 (=6×6=M×N).

When the parameters of various types described above have been set, the image processing unit 105 photographs and acquires the single photographic subject, and generates a plurality of sets of viewpoint image data using the image signals that have been stored in the memory 103. And, as described above, among the image signals outputted from the image capture pixels 131 in the pixel array 130 corresponding to one microlens 120, the image processing unit 105 extracts the pixel signals outputted from the image capture pixels 131 included in the block Blo that has been set. And the image processing unit 105 also extracts the pixel signals in a similar manner for all of the pixel arrays 130, and generates one set of viewpoint image data Im using the plurality of pixel signals that have thus been extracted. And, while shifting the processing described above by just the shift amounts Sx and Sy for the blocks Blo that have been set, the image processing unit 105 generates a plurality of sets of viewpoint image data Im by performing shifting of the block Blo by the numbers of times Kx, Ky that have been set. At this time, the image processing unit 105 extracts image signals on the basis of the results of calculation by the calculation unit 106. In other words, the calculation unit 106 determines the image signals to be extracted in order to generate the viewpoint image data Im.

First, the calculation processing performed by the calculation unit 106 will be explained.

The coordinate system (m,n) for the microlens array 12 in the XY plane is shown in FIG. 9(a). In this coordinate system, the position of the microlens 120 at the lower left corner of the figure is expressed as (m,n)=(0,0). It should be understood that, in FIG. 9(a), 0≤m<6 and 0≤n<6. Furthermore, the coordinate system (i,j) for the image capture element 13 in the XY plane is shown in FIG. 9(b). In this coordinate system of FIG. 9(b) for the image capture element 13, the pixel value from the image capture pixel 131 located at (i,j), in other words the image signal from that pixel, is expressed as I(i,j).

First, using the following Equations 1, the calculation unit 106 calculates the center position (X0,Y0) of the microlens 120 that is located at the position (m,n)=(0,0). It should be understood that, as described above, the coefficient p is a fixed parameter that specifies the array pitch of the microlenses 120 in the X axis direction, while the coefficient q is a fixed parameter that specifies the array pitch of the microlenses 120 in the Y axis direction.

$$X0=mp+p/2$$

$$Y0=nq+q/2 \quad (1)$$

Next, using the following Equations (2), the calculation unit 106 calculates the initial (X,Y) position of the block Blo on the microlenses 120 (i.e. the lower left corner). As described above, the coefficient s is a fixed parameter that specifies the array pitch of the image capture pixels 131 in the X axis direction, and the coefficient t is a fixed parameter that specifies the array pitch of the image capture pixels 131 in the Y axis direction. Moreover, the coefficient Nx is a parameter that specifies the number of viewpoint image data sets Im generated in the X axis direction, and 0≤Nx<Kx. And the coefficient Ny is a parameter that specifies the number of viewpoint image data sets Im generated in the Y axis direction, and 0≤Ny<Ky.

$$X=X0+U0+s \cdot Nx \cdot Sx$$

$$Y=Y0+V0+t \cdot Ny \cdot Sy \quad (2)$$

When generating the five sets of viewpoint image data shown in FIG. 3 and the four sets of viewpoint image data shown in FIG. 4, the initial position (X,Y) of the block Blo is specified as in the following Equations (2)'. It should be understood that, as described above, the coefficient v is the number of image capture pixels 131 included in the block Blo in the Y axis direction.

$$X = mp + s \cdot Nx$$

$$Y = (n + \tfrac{1}{2})q - tv/2 \qquad (2)'$$

The calculation unit 106 converts the initial position (X,Y) of the block Blo that has been calculated using Equation (2) to the coordinate system (i,j) of the image capture element 13. At this time, the calculation unit 106 uses the following Equations (3).

$$i = X/s$$

$$j = Y/t \qquad (3)$$

When generating the five sets of viewpoint image data shown in FIG. 3, the initial position (X,Y) of the block Blo is converted to the position shown in the following Equations (3)'. It should be understood that the conversion below is based upon it being possible for the parameters in FIG. 3 to be given by U0=−p/2, V0=−tv/2, p=5s, q=5t, u=1, and v=1.

$$i = X/s = mp/s + Nx = 5m + Nx$$

$$j = Y/t = (n + \tfrac{1}{2})q/t - v/2 = 5n + 2 \qquad (3)'$$

When generating the four sets of viewpoint image data shown in FIG. 4, the initial position (X,Y) of the block Blo is converted to the position shown in the following Equations (3)". It should be understood that the conversion below is based upon it being possible for the parameters in FIG. 3 to be given by U0=−p/2, V0=−tv/2, p=5s, q=5t, u=2, and v=3.

$$i = X/s = mp/s + Nx = 5m + Nx$$

$$j = Y/t = (n + \tfrac{1}{2})q/t - v/2 = 5n + 1 \qquad (3)''$$

The image processing unit 105 extracts the image signal I using the initial position of the block Blo calculated by Equations (3) above. In other words, the image processing unit 105 takes the image signal corresponding to the initial position (i,j) calculated with Equations (3) as a reference, and calculates the sum (block signals Ib(i,j)) of the image signals included in the block Blo. In this case, the image processing unit 105 calculates the block signals Ib(i,j) using the following Equation (4).

$$Ib(i, j) = \qquad (4)$$
$$\sum I(i+k-1, j+1-1) = I(i,j) + I(i,j+1) + \ldots + I(i, j+v-1) +$$
$$I(i+1, j) + I(i+1, j+1) + \ldots + I(i+1, j+v-1) +$$
$$I(i+2, j) + I(i+2, j+1) + \ldots + I(i+2, j+v-1) + \ldots +$$
$$I(i+u-1, j) + I(i+u-1, j+1) + \ldots + I(i+u-1, j+v-1)$$

When generating the five sets of viewpoint image data shown in FIG. 3, the block signals Ib(i,j) are the values given by the following Equation (4)'. Moreover, when generating the four sets of viewpoint image data shown in FIG. 4, the block signals Ib(i,j) are the values given by the following Equation (4)".

$$Ib(i,j) = I(i,j) = I(5m + Nx, 5n + 2) \qquad (4)'$$

$$Ib(i,j) = I(i,j) + I(i,j+1) + I(i,j+2) + I(i+1,j) + I(i+1,j+1) + I(i+1,j+2) \qquad (4)''$$

The image processing unit 105 generates one set of viewpoint image data Im by using the block signals Ib(i,j) that have been generated by performing the above processing for all of the microlenses 120. In other words, the image processing unit 105 adds together the block signals Ib, so that the block signals Ib(i,j) give one pixel value within the viewpoint image data Im. Thereafter, the calculation unit 106 newly calculates the initial position (i,j) of the block Blo when the block Blo has been shifted by the shift amounts Sx, Sy that have been set in the shift direction (arctan(Sy/Sx)) that has been set. And the image processing unit 105 newly calculates the block signals Ib(i,j) using Equations (4) on the basis of the initial position (i,j) of the block Blo that has been newly calculated, and generates a different single set of viewpoint image data Im. The image processing unit 105 repeats the processing described above by the set number of shifting times Kx, Ky, and thus generates the plurality of sets of viewpoint image data Im.

Then the image processing unit 105 generates a multiple viewpoint image file using the plurality of sets of viewpoint image data Im that have been generated as described above, and records this file to the memory card 107a. It should be understood that it would also be acceptable to arrange for the image processing unit 105 to establish a correspondence between each sets of viewpoint image data Im that have thus been generated, and to record it to the memory card 107a.

Figure 10:
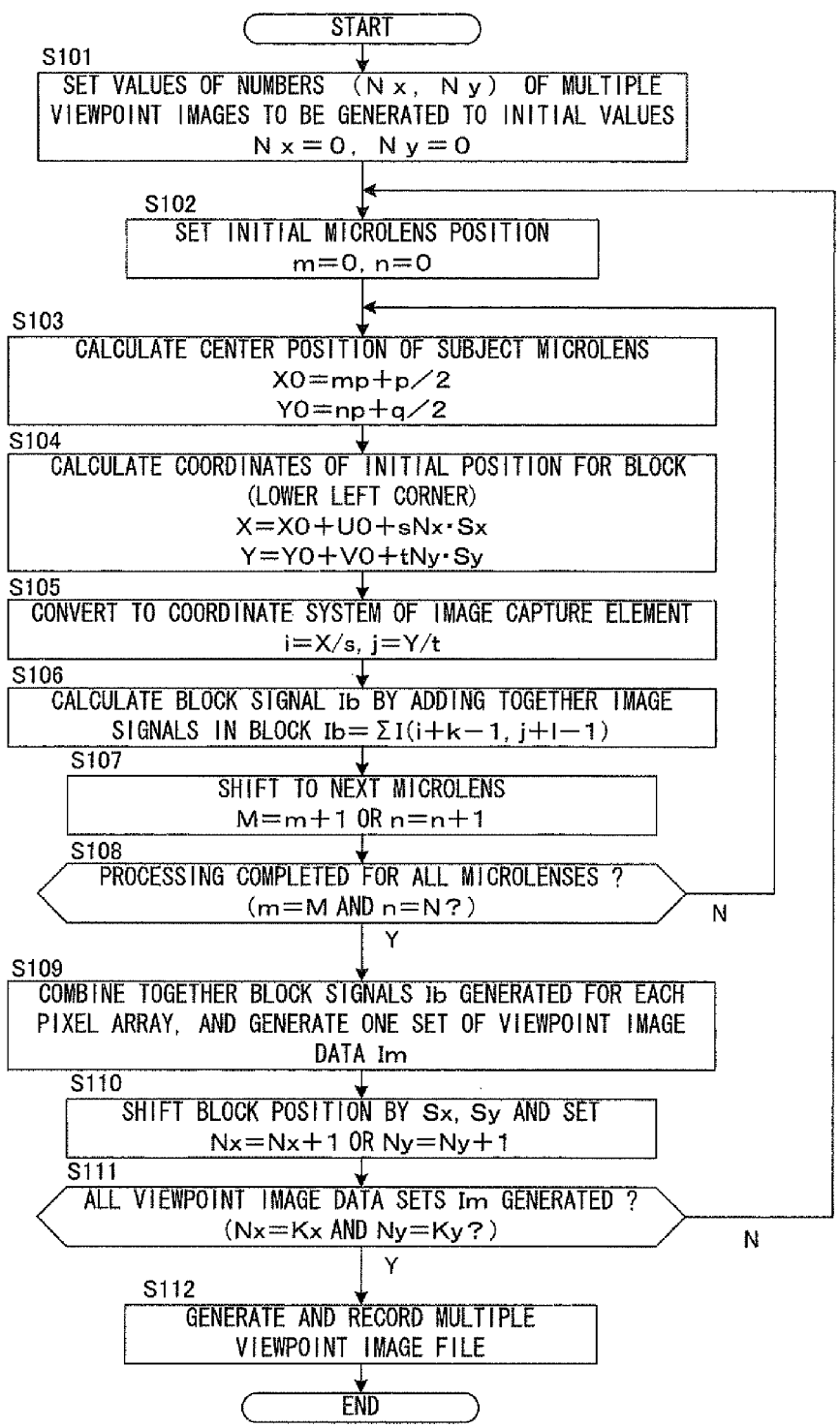
FIG. 10 is a flow chart for explanation of the processing in this digital camera according to the first embodiment.

The multiple viewpoint image generation processing explained above will now be explained using the flow chart of FIG. 10. The various processes shown in FIG. 10 are recorded in a memory within the control circuit 101 not shown in the figures, and are started and executed by the control circuit 101 when, in the state in which the multiple viewpoint image creation mode is set, an image signal that has been acquired by photographic processing is stored in the memory 103.

In a step S101, the value (Nx,Ny) of the number of viewpoint images to be generated is set to 0, this being its initial value, and then the flow of control proceeds to a step S102. And in this step S102 the values of m,n are set to 0 as being the initial microlens 120 position, and then the flow of control proceeds to a step S103.

In the step S103, the center position of the microlens 120 that is to be the subject is calculated using Equations (1), and then the flow of control proceeds to a step S104. In this step S104, the initial position for the block Blo in the coordinate system of the microlenses 120, in other words the coordinates of the lower left corner, is calculated using Equations (2), and then the flow of control proceeds to a step S105. In this step S105, the coordinate values calculated in the step S104 are converted to the coordinate system (i,j) of the image capture element 13 using Equations (3), and then the flow of control proceeds to a step S106.

In this step S106, the image signals outputted from the image capture pixels 131 included in the block are added together using Equation (4), so as to generate the block signal Ib, and then the flow of control proceeds to a step S107. In this step S107, the processing shifts to the next microlens 120 (m=m+1 or n=n+1), and then the flow of control proceeds to a step S108. In this step S108, a decision is made as to whether or not processing has been completed for the pixel arrays 130 that correspond to all of the microlenses 120. If processing has been completed for all of the pixel arrays 130, in other words if m=M and also n=N, then the flow of control proceeds to a step S109. But if processing has not been completed for all of the pixel arrays 130, then a negative decision is reached in the step S108 and the flow of control returns to the step S103.

In the step S109, the block signals Ib generated for each of the pixel arrays 130 are combined together and one set of viewpoint image data Im is generated, and then the flow of control proceeds to a step S110. In this step S110, the position of the block is shifted by just Sx, Sy, this being the shift amount that has been set. And the number of viewpoint images is set to Nx=Nx+1 or Ny=Ny+1, and then the flow of control proceeds to a step S111.

In the step S111, a decision is made as to whether or not the number of sets of viewpoint image data Im that have been generated is equal to the number of viewpoints (Kx,Ky) that has been set. If the set number of sets of viewpoints of viewpoint image data Im have been generated, in other words if Nx=Kx and also Ny=Ky, then an affirmative decision is reached in this step S11 and the flow of control proceeds to a step S112. But if the number of sets of viewpoint image data Im that have been generated is not equal to the set number of viewpoints, then a negative decision is reached in this step S111 and the flow of control returns to the step S102. In the step S112, a multiple viewpoint image file is generated using the Kx×Ky sets of viewpoint image data Im that have been generated, this file is recorded upon the memory card 107a, and then processing terminates.

(D) Three Dimensional Display

The processing will now be explained for displaying on the display device 109 a three dimensional image corresponding to each of the plurality of sets of viewpoint image data Im that have been generated as described above.

As shown in FIG. 11, the display device 109 includes a lenticular lens 150 that has a plurality of convex lenses 151, each of which has a surface shape like a cylinder cut along its axial direction. In other words, the display device 109 can display a plurality of viewpoint images as a three dimensional image according to a per se known lenticular method. As shown in FIG. 11(a), in this embodiment, the lengthwise direction of each of the convex lenses 151 is oriented along the Y axis direction. It should be understood that, as in the preceding description, the subsequent explanation will concentrate upon the processing in the X axis direction as being representative.

A sectional view of the display device 109 in the XZ plane is shown in FIG. 11(b). Each of the convex lenses 151 of the lenticular lens 150 condenses the light from a plurality of pixel columns Co along the Y axis direction and conducts it to the user. In FIG. 11(b), the one convex lens 151a is condensing the light emitted from the pixel columns Co1_1 through Co1_5 of the display device 109. And, among the light conducted from the plurality of convex lenses 151, the light from the pixel columns Co1_1, Co2_1, C,3_1, . . . is imaged at the point W1. In a similar manner, the light from the pixel columns Co1_2, Co2_1, C,3_2, . . . is imaged at the point W2, the light from the pixel columns Co1_3, Co2_3, C,3_3, . . . is imaged at the point W3, the light from the pixel columns Co1_4, Co2_4, C,3_4, . . . is imaged at the point W4, and the light from the pixel columns Co1_5, Co2_5, C,3_5, . . . is imaged at the point W5.

Accordingly, when the user (i.e., the viewer) observes the image that is displayed upon the display device 109 from the position H1, with his right eye he will observe the image of the point W1, in other words the light from the pixel columns Co1_1, Co2_1, Co3_1, . . . , while with his left eye he will observe the image of the point W2, in other words the light from the pixel columns Co1_2, Co2_2, Co3_2, . . . . Moreover, if the user (i.e. the viewer) observes the image from the position H2, then with his right eye he will observe the image of the point W4 (the light from the pixel columns Co1_4, Co2_4, Co3_4, . . . ), while with his left eye he will observe the image of the point W5 (the light from the pixel columns Co1_5, Co2_5, Co3_5, . . . ).

It should be understood that it would be acceptable to arrange for the display device 109 to display the plurality of viewpoint images as a three dimensional image by employing a parallax barrier method. In this case, a mask (i.e. a barrier) would be provided at the position at which the lenticular lens 150 of FIG. 11 is disposed, and would have a plurality of long and narrow apertures arranged along its long side in the Y axis direction.

Figure 12:
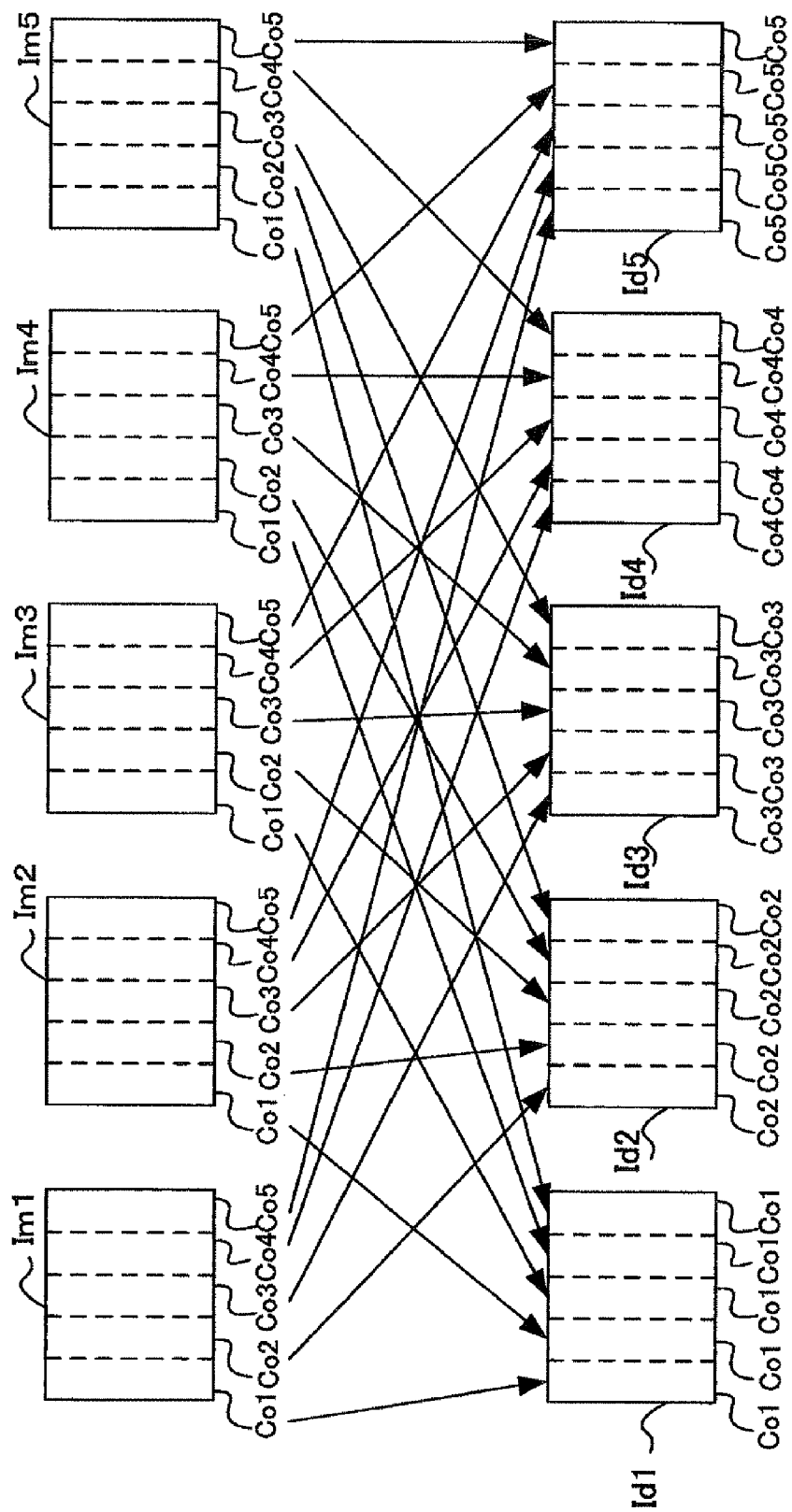
FIG. 12 is a conceptual figure for explanation of processing for generating image data for display.

The processing for generation of data for display to be outputted to the display device 109 upon which a three dimensional image can be displayed as described above will now be explained using the conceptual diagram shown in FIG. 12. It will be supposed that Im1, Im2, . . . Im5 are viewpoint image data (for example, having five viewpoints) corresponding to a multiple viewpoint image for which the same photographic field has been photographed with parallax. In this case, the image processing unit 105 creates a single set of image data Id1 for display by extracting and combining image data corresponding to the same pixel column Co1 from each of the sets of viewpoint image data Im1, Im2, . . . Im5. Moreover, the image processing unit 105 creates a single set of image data Id2 for display by extracting and combining image data corresponding to the same pixel column Co2 from each of the sets of viewpoint image data Im1, Im2, . . . Im5. And subsequently, in a similar manner, the image processing unit 105 creates sets of image data Id3 through Id5 for display.

When these sets of image data Id1 through Id5 for display have been created, the image processing unit 105 outputs the set of image data Id1 for display to the LCD drive control unit 110, thus causing it to display an image corresponding to this set of image data Id1 for display on Co1 of the display device 109. And the image processing unit 105 outputs the sets of the image data Id2 through Id5 for display to the LCD drive control unit 110 in a similar manner, thus causing Co2 through Co5 of the display device 109 to display images corresponding to the sets of image data Id2 through Id5 for display respectively.

As described above, since the light from the pixel columns Co1_1, Co2_1, Co3_1, . . . is imaged at the point W1, accordingly an image that corresponds to the viewpoint image data Im1 is observed at the point W1. In a similar manner, an image that corresponds to the viewpoint image data Im2 is observed at the point W2, an image that corresponds to the viewpoint image data Im3 is observed at the point W3, an image that corresponds to the viewpoint image data Im4 is observed at the point W4, and an image that corresponds to the viewpoint image data Im5 is observed at the point W5. As described above, a user who is positioned at H1 observes the point W1 with his right eye and the point W2 with his left eye. In other words, a user at H1 comes to observe an image corresponding to the viewpoint image data Im1 with his right eye, and comes to observe an image corresponding to the viewpoint image data Im2 with his left eye. Some parallax is present between sets of the viewpoint image data Im1 and Im2, and the user observes the images that correspond to sets of the viewpoint image data Im1 and Im2 with different eyes. As a result, these images in which the same photographic field has been photographed are seen by the user as a three dimensional image. It should be understood that, if the user is positioned at H2, then, by the user observing an image corresponding to the viewpoint image data Im4 with his right eye, and observing an image corresponding to the viewpoint image data Im5 with his left eye, he will observe these images in which the same photographic field has been photographed as a three dimensional image.

According to the first embodiment explained above, the following beneficial operational effects are obtained.

(1) The plurality of microlenses 120 are arranged in a two dimensional configuration in the vicinity of the focal plane of the photographic lens L1. And the image capture element 13 includes the plurality of pixel arrays 130 each of which has the plurality of photoelectric conversion elements (i.e. image capture pixels) 131, and that are arranged in a two dimensional configuration corresponding to the plurality of microlenses 120 respectively. These image capture pixels 131 receive the light flux from the photographic subject that has passed through the photographic lens L1 via the microlenses 120, and output image signals. The image processing unit 105 extracts, from the image signals respectively outputted from the plurality of image capture pixels 131 included in each of the plurality of pixel arrays 130, the plurality of block signals Ib respectively corresponding to the plurality of different partial regions P upon the photographic lens L1, and generates the plurality of sets of image data Im respectively corresponding to these partial regions P on the basis of the block signals that have been extracted, as the sets of viewpoint image data Im whose viewpoint positions are each different. In other words, among the plurality of block signals Ib that have been respectively extracted from the plurality of pixel arrays 130, the image processing unit 105 generates one set of viewpoint image data Im by combining together those block signals Ib that have been extracted from different ones of the pixel arrays 130, but that correspond to the same partial region P. Moreover, the operation unit 108 receives an operation of selection by the user of a number of viewpoints. And it is arranged for the image processing unit 105 to generate the sets of viewpoint image data Im by extracting a number of block signals Ib equal to the number of viewpoints selected by operation by the user.

In display of a three dimensional image in which it is easy for pseudo stereoscopy to take place or for blurring or moire patterning to occur due to the direction when the viewpoint moves, in other words in three dimensional display by the double-eye method in which seeing is difficult so that it is easy for the eyes to become tired, it is desirable to employ a display that has a large number of viewpoints (the multi-view naked eye method) with which it is difficult for pseudo stereoscopy to occur. In the prior art, in order to acquire an image in this multi-viewpoint format that can be seen by the naked eye, the complicated procedure was required of either performing photography a plurality of times while changing position, or of performing photography by lining up a large number of cameras, or the like. Moreover, in three dimensional image display, a very important factor in order for tiredness and anomalous vision not to be caused is for the position of convergence (i.e. the intersection of the viewpoints of the two eyes) and the point of focus to coincide with one another. However generally, with an image that has been captured according to the stereo method, often a structure is adopted in which the two cameras are set to be parallel and the focus is adjusted to infinity (so called parallel stereo), so that it is difficult to satisfy this condition.

Since, due to the digital camera 1 of this embodiment having the structure described above, the user is able to acquire the same number of sets of viewpoint image data as the number of viewpoints desired according to the characteristics of the display by using just a single camera, accordingly the convenience is enhanced. Furthermore, in a manner similar to the case with normal single lens reflex photography, it is possible to exchange the lens freely and to perform photography while setting the focal point to any desired position for the photographic subject by using the focus adjustment function. In this case, even if the lens is exchanged or its focal length is changed as in the case of a zoom lens or the like, and even if the position of the photographic subject upon which the focal position is set is changed, since the position of convergence and the position of the focal point are always the same, accordingly it is still possible to photograph an image that can be shown as a natural three-dimension without tiring the eye of the viewer. In other words since it is possible, from an image that has been photographed after performing focus adjustment in a similar manner to the way this is done with a normal camera, to manufacture an image that gives the feeling of a three-dimension at positions before and beyond the position at which the photographic subject is focused, accordingly it is possible to photograph a three dimensional image without imparting any sense of discomfort to the user, as when a photograph is taken using a normal type of camera.

(2) The calculation unit 106 calculates the same number of blocks Blo as the number of viewpoints that has been selected by the user as the extraction regions for extracting the block signals Ib, and sets each of them upon the pixel array 130. And for each of these blocks Blo that has thus been set, it is arranged for the image processing unit 105 to add together the image signals outputted from the image capture pixels 131 that are included in the block Blo, and to extract the result as the block signal Ib. Thus, since it is possible to generate a number of sets of viewpoint image data Im equal to the number of viewpoints that the user desires, accordingly it is possible to perform three dimensional image photography with a single camera corresponding to the characteristics of the monitor upon which the three dimensional image is to be displayed and so on.

(3) The operation unit 108 receives operation by the user for selecting a parallax that specifies the amount of change of viewpoint between the plurality of sets of viewpoint image data Im. And the calculation unit 106 set the blocks Blo upon the pixel array 130 with positional gaps between them corresponding to the parallax that has been set by the user. In other words, the calculation unit 106 calculates the amount of shifting of the blocks Blo. And it is arranged for the image processing unit 105 to extract the block signals Ib for each of these blocks Blo in the plurality of positions, so as to generate the sets of viewpoint image data Im. Accordingly the convenience is enhanced, since it is possible for photography of a three dimensional image having the parallax that the user desires to be performed with a single camera.

(4) The operation unit 108 receives operation by the user for selecting the depth of photographic subject field of the image. And the calculation unit 106 sets the size of the blocks Blo according to the depth of the photographic subject field that has been selected by the user. Moreover, corresponding to the size of the blocks Blo that has been calculated, it is arranged for the image processing unit 105 to combine the plurality of image signals I from the image capture pixels 131 that are included in the block Blo and to extract them as a single block signal Ib, so as to generate the viewpoint image data Im. Accordingly, with a simple operation, it is possible to obtain the depth of photographic subject field that is desired by the user as a three dimensional image.

(5) The operation unit 108 receives operation by the user for changing the position of the viewpoint in a direction in two dimensions. And, according to operation by the user, the calculation unit 106 calculates and sets the direction for extracting the same number of blocks Blo as the number of viewpoints. Moreover, it is arranged for the image processing unit 105 to extract the block signals Ib from the blocks Blo along the direction that has been calculated, and thus to generate the sets of viewpoint image data Im. Therefore, since it is possible to generate sets of viewpoint image data Im whose viewpoints are different along the direction that is desired by the user, accordingly it becomes possible, by using a single camera, to perform three dimensional image photography according to the characteristics of the monitor upon which the three dimensional image is to be displayed and so on.

(6) It is arranged for the image processing unit 105 to generate image data for display Id on the basis of the plurality of sets of viewpoint image data Im that have been generated, and to display an image corresponding to this image data Id for display upon the display device 109 as a three dimensional image. Accordingly, the user is able immediately to observe, as a three dimensional image, an image corresponding to the viewpoint image data that he has photographed.

Embodiment 2

A digital camera according to a second embodiment of the present invention will now be explained with reference to the drawings. In the following explanation, the same reference symbols will be appended to structural elements that are the same as ones of the first embodiment, and the explanation will concentrate upon the features of difference. Aspects that are not particularly explained are the same as in the first embodiment. In this embodiment, the feature that the size of one microlens 120 is not an integral multiple of the size of an image capture pixel 131 is different from the case with the first embodiment. In this case, the calculation processing by the calculation unit 106 and the calculation processing for the block signals Ib by the image processing unit 105 become different from the case with the first embodiment.

FIG. 13 shows the relationship in the coordinate system (i,j) on the image capture element 13 in the XY plane between a microlens 120 and the size of the image capture pixels 131. As shown in FIGS. 13(a) and 13(b), the diameter of the microlenses 120 of this second embodiment in the direction parallel to the X axis or to the Y axis is not an integral multiple of the size of the image capture pixels 131. In other words, in the X axis direction, partial regions of image capture pixels 131$u$ and 131$v$ are included in the X axis direction of the microlenses 120. It should be understood that it will be supposed that the cross shaped mark in FIG. 13 shows the position of the center of the microlens 120.

FIG. 13(a) shows a case in which 1×1, in other words u=v=1, is set as the size of the blocks Blo. The block Blo has a size such that its region includes a portion of each of the four image capture pixels 131$a$ through 131$d$. In this case, the calculation unit 106 calculates the proportion (hereinafter termed the occupation proportion) that the region over which the image capture pixel 131$a$ and the block Blo overlap one another occupies in the entire area of the image capture pixel 131$a$. And the image processing unit 105 multiplies the occupation proportion thus calculated by the calculation unit 106 by the image signal outputted from the image capture pixel 131$a$. The above processing is also performed for the image capture pixels 131$b$ through 131$d$ that are included in the block Blo, and then the image processing unit 105 calculates the block signal Ib of the block Blo by adding together these image signals that have thus been calculated.

FIG. 13(b) shows a case in which the size of the blocks Blo has been generalized to u×v. Portions of each of fourteen image capture pixels 131$a$ through 131$n$ and the entireties of six image capture pixels 131$o$ through 131$t$ are included in the block Blo. In this case, in a similar manner to the case with FIG. 13(a), the image processing unit 105 calculates the interpolated signal by multiplying the occupation proportions calculated by the calculation unit 106 by the image signals from the respectively corresponding image capture pixels 131$a$ through 131$n$. And the image processing unit 105 calculates the block signal Ib by adding together the interpolated signals from each of the image capture pixels 131$a$ through 131$n$ that have thus been calculated and the image signals outputted from each of the image capture pixels 131$o$ through 131$t$. In other words, the image processing unit 105 calculates the block signal Ib by performing weighting upon the image signals according to their occupation proportions. This will now be explained in detail below.

First, the calculation unit 106 calculates the center position (X0, Y0) of the microlens 120 that is provided at the position (m,n)=(0,0) by using Equations (5) below. It should be understood that, as described above, the coefficient p is a fixed parameter that specifies the array pitch of the microlenses 120 in the X axis direction, while the coefficient q is a fixed parameter that specifies the array pitch of the microlenses 120 in the Y axis direction.

$$X0=mp+p/2$$

$$Y0=nq+q/2 \tag{5}$$

Next, using the following Equations (6), the calculation unit 106 calculates the initial position (X,Y) of the block Blo on the microlenses 120 (i.e. the lower left corner). As described above, the coefficient "s" is a fixed parameter that specifies the array pitch of the image capture pixels 131 in the X axis direction, and the coefficient "t" is a fixed parameter that specifies the array pitch of the image capture pixels 131 in the Y axis direction. Moreover, the coefficient Nx is a parameter that specifies the number of sets of viewpoint image data Im generated in the X axis direction, and 0≤Nx<Kx. And the coefficient Ny is a parameter that specifies the number of sets of viewpoint image data Im generated in the Y axis direction, and 0≤Ny<Ky.

$$X=X0+U0-u/2+s \cdot Nx \cdot Sx$$

$$Y=Y0+V0-v/2+t \cdot Ny \cdot Sy \tag{6}$$

The calculation unit 106 converts the initial position (X,Y) of the block Blo that has been calculated using Equation (6) to the coordinate system (i,j) of the image capture element 13. In other words, it expresses the initial position of the block Blo using an integer portion in the coordinate system (i,j) of the image capture element 13 and a decimal portion generated as a fraction. At this time, the calculation unit 106 uses the following Equations (7).

$$i+a=X/s$$

$$j+b=Y/t \tag{7}$$

The values of "a" and "b" shown in Equations (7) give the amounts by which the lower left corner of the block Blo shown in FIG. 13(b) deviates in the X axis direction and in the Y axis direction respectively from the lower left corner of the image capture pixel 131$s$. To put it in another manner, the values of this "a" and "b" give the occupation proportions described above.

The image processing unit 105 extracts the image signal I using the initial position of the block Blo calculated by Equations (7) above. In other words, the image processing unit 105 takes the image signal corresponding to the initial position (i,j) calculated with Equations (7) as a reference, and calculates the sum (block signals Ib(i,j)) of the image signals included in the block Blo. In this case, the image processing unit 105 calculates the block signals Ib(i,j) using the following Equation (8).

$$Ib(i, j) = (1-a) \cdot (1-b) \cdot I(i, j) + (1-a) \cdot b \cdot I(i+u, j) + \qquad (8)$$
$$a \cdot b \cdot I(i+u, j+v) + (1-a) \cdot \{I(i, j+1) + \ldots + I(i, j+v-1)\} +$$
$$a \cdot \{I(i+u, j+1) + \ldots I(i+u, j+v-1)\} +$$
$$(1-b) \cdot \{I(i+1, j) + \ldots + I(i+u-1, j)\} +$$
$$b \cdot \{I(i+1, j) + \ldots + I(i+u-1, j)\} + I(i+1, j+1) + \ldots +$$
$$I(i+u-1, j+1) + I(i+1, j+v-1) + \ldots + I(i+u-1, j+v-1)$$

The block signal Ib(i,j) of the block Blo shown in FIG. 13(*a*) becomes the values given by the following Equation (8)'.

$$Ib(i, j) = (1-a) \cdot (1-b) \cdot I(i, j) + (1-a) \cdot b \cdot I(i, j+1) + \qquad (8)'$$
$$a \cdot (1-b) \cdot I(i+1, j) + a \cdot b \cdot I(i+1, j+1)$$

When calculating the block signals Ib as described above, in a similar manner to the case with the first embodiment, the image processing unit 105 calculates the block signals Ib at a position to which the block Blo has been shifted by just the set shift amounts Sx and Sy. The way in which the block Blo is shifted according to the results of calculation by the calculation unit 106 is shown in FIG. 13(*c*). It should be understood that, in this second embodiment, it is arranged for the image processing unit 105 to be capable of calculating the block signals Ib even if the diameter of the microlenses 120 is not an integral multiple of the size of the image capture pixels 131. Accordingly, even if the shift amounts Sx and Sy for the block Blo are not integral multiples, it will still be possible for the image processing unit 105 to calculate the block signals Ib at the position of the block Blo after shifting. To put this in another manner, the shift amounts for the block Blo may be set by the user to any desired real numerical values.

Figure 14:
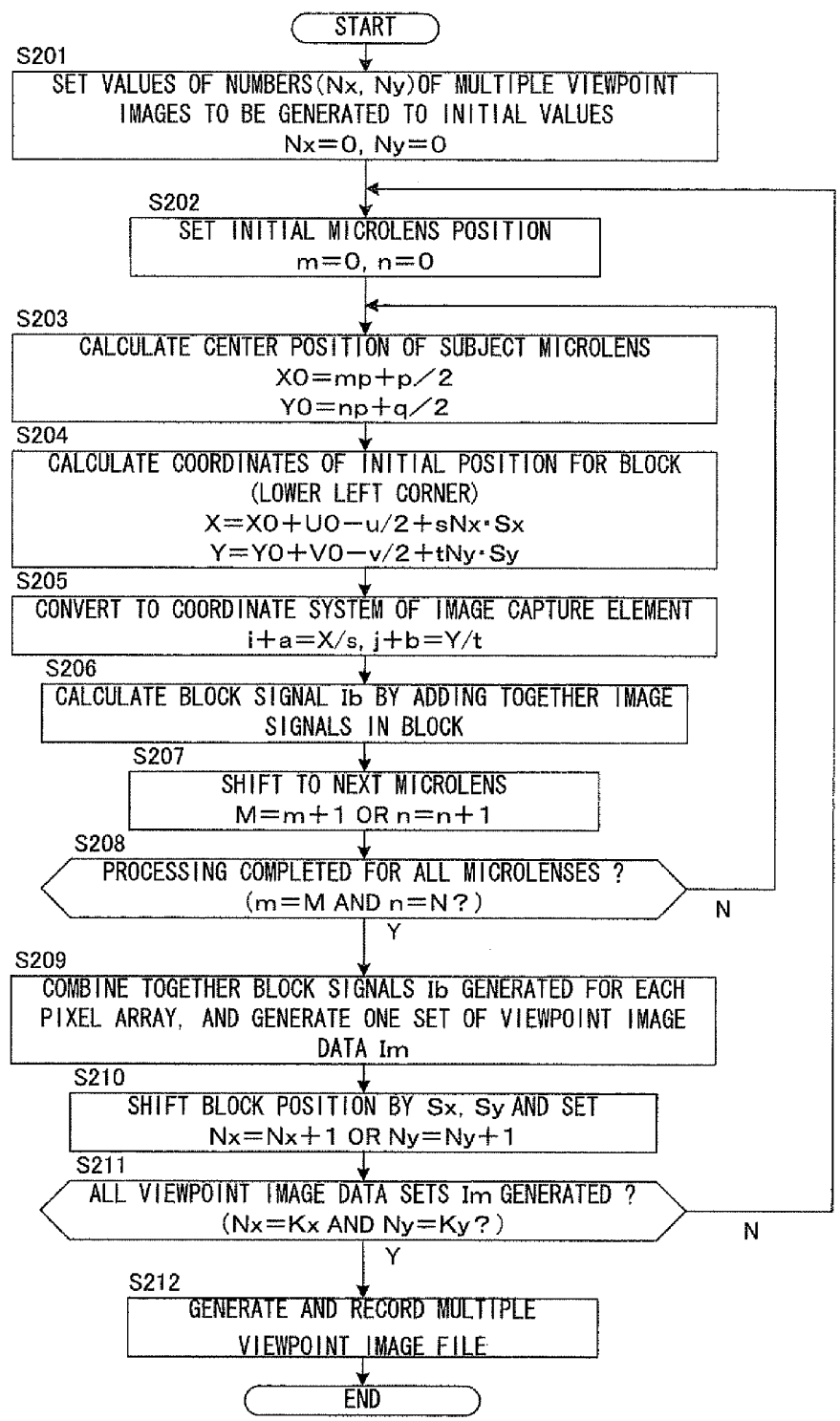
FIG. 14 is a flow chart for explanation of the processing in this digital camera according to the second embodiment.

The multiple viewpoint image generation processing by this digital camera 1 according to the second embodiment explained above will now be explained using the flow chart of FIG. 14. The various processes shown in FIG. 14 are recorded in a memory within the control circuit 101 not shown in the figures, and are started and executed by the control circuit 101 when, in the state in which the multiple viewpoint image creation mode is set, an image signal that has been acquired by photographic processing is stored in the memory 103.

In a step S201, the value (Nx,Ny) of the number of viewpoint images to be generated is set to 0 that is its initial value, and then the flow of control proceeds to a step S202. And in this step S202 the values of "m", "n" are set to 0 as being the initial microlens 120 position, and then the flow of control proceeds to a step S203.

In the step S203, the center position of the microlens 120 that is to be the subject is calculated using Equations (5), and then the flow of control proceeds to a step S204. In this step S204, the initial position for the block Blo in the coordinate system of the microlenses 120, in other words the coordinates of the lower left corner, is calculated using Equations (6), and then the flow of control proceeds to a step S205. In this step S205, the coordinate values calculated in the step S204 are converted to the coordinate system (i,j) of the image capture element 13 using Equations (7), and then the flow of control proceeds to a step S206.

In this step S206, the image signals outputted from the image capture pixels 131 included in the block Blo are added together using Equation (8), so as to generate the block signal Ib, and then the flow of control proceeds to a step S207. The processes from the step S207 (shifting to the next microlens) to the step S212 (generation and recording of the multiple viewpoint image file) are the same as the processes from the step S107 (shifting to the next microlens) to the step S112 (generation and recording of the multiple viewpoint image file) shown in FIG. 14.

According to this second embodiment as explained above, in addition to the beneficial operational effects obtained with the first embodiment, the following further beneficial operational effects are obtained.

If the block Blo that is calculated by the calculation unit 106 overlaps with a portion of one of the image capture pixels 131, then it is arranged for the image processing unit 105 to extract the block signal Ib while applying a weighting to the image signal outputted from the overlapped image capture pixel 131 that is determined according to the extent of the overlapping. Accordingly, it is possible to generate the three dimensional image that the user desires, even if the accuracy of mounting of the image capture pixels 131 and the microlenses 120 is low. Furthermore it is possible to implement any viewpoint conditions desired by the user, since the size and the shifting amount of the block Blo and so on are not constrained by the image capture pixels 131.

Embodiment 3

A digital camera according to a third embodiment of the present invention will now be explained with reference to the drawings. In the following explanation, the same reference symbols will be appended to structural elements that are the same as ones in the first and second embodiments, and the explanation will concentrate upon the features of difference. Aspects that are not particularly explained are the same as in the first or the second embodiment. In this embodiment, the feature that it is arranged for it to be possible to generate a multiple viewpoint (multiple parallax) image, even if the user performs photography of an image while holding the digital camera in the vertical orientation, is different from the cases of the first and the second embodiment.

Figure 15:
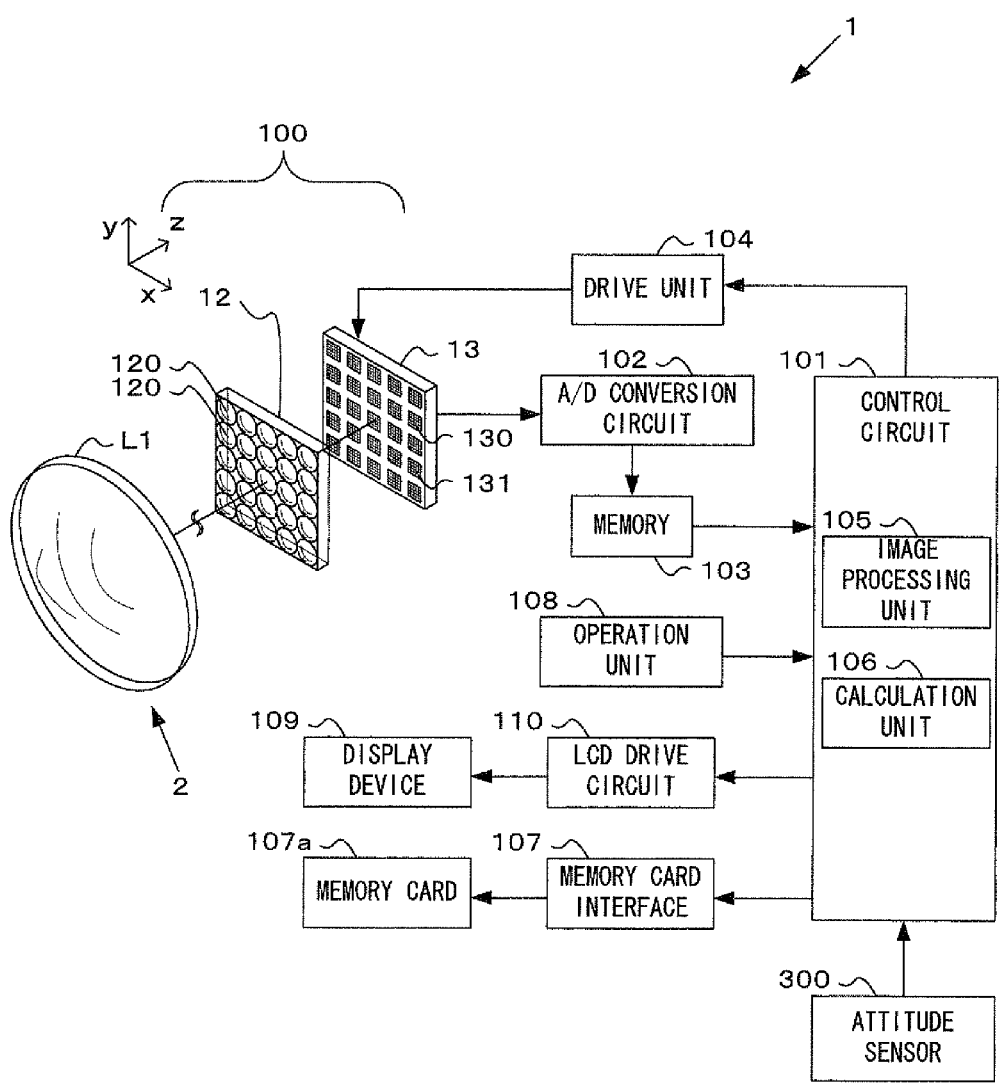
FIG. 15 is a figure for explanation of the structure of a digital camera according to a third embodiment.

A block diagram of the control system of this digital camera 1 according to the third embodiment is shown in FIG. 15. An attitude sensor 300 consists of, for example, a tilt sensor or a gyro sensor or the like, and detects the direction of gravity acting upon the digital camera 1 and outputs its detection signal to a control circuit 101. And, on the basis of this detection signal that is inputted, the control circuit 101 determines the attitude of the digital camera 1, in other words whether the attitude is a horizontally positioned attitude or a vertically positioned attitude. The attitude of the digital camera 1 determined according to the detection signal from the attitude sensor 300 during image data acquisition is stored as attitude information in the memory 103, in correspondence with the image data.

When the multiple viewpoint image creation mode is set, the control circuit 101 refers to the attitude information that is stored in the memory 103 in correspondence with the image data that is the subject. If this attitude information specifies the vertically positioned attitude, then the calculation unit 106 performs the calculation processing explained above with reference to the first and second embodiments, while considering the X axis fixed parameters (M, Cx, p, and s) and variable parameters (U0, Kx, Sx, and u) as being the set values for the Y axis direction, and while considering the Y axis fixed parameters (N, Cy, q, and t) and variable parameters (V0, Ky, Sy, and v) as being the set values for the X axis direction. And the image processing unit 105 generates viewpoint image data Im in which the number of viewpoints in the Y axis direction is different.

According to this third embodiment as explained above, in addition to the beneficial operational effects obtained with the first embodiment or the second embodiment, the further beneficial operational effects are obtained.

It is arranged for the attitude sensor 300 to detect the attitude of the digital camera 1. And, if the attitude that has been detected by the attitude sensor 300 is photography in the vertical position, then the calculation unit 106 sets the shifting direction for the block Blo so that the positions of the viewpoints upon the image capture element 13 are along the Y axis direction, in other words so that these positions are different from what they are during photography in the horizontal position. And it is arranged for the image processing unit 105 to extract the block signals Ib along the direction that has thus been set, in other words along the Y axis direction, and to generate the viewpoint image data Im accordingly. Thus the convenience is enhanced, since it is possible to generate a three dimensional image with this single camera either by photography in the vertically positioned attitude or by photography in the horizontally positioned attitude.

The digital cameras 1 of the first through the third embodiments explained above may be altered in the following ways.

(1) Instead of displaying an image corresponding to the image data for display Id generated by the image processing unit 105 using the multiple viewpoint image data as a three dimensional display upon the display device 109, it would also be acceptable to arrange to display it upon a monitor that is provided by an external display device that is different from the digital camera 1 (for example, a personal computer, a television, or the like). In this case, the external display device would read in the multiple viewpoint image file that has been generated by the digital camera and has been recorded upon the memory card 107a. And, using the viewpoint image data Im in the multiple viewpoint image file that has been read in, the display device would generate image data for display Id by performing similar processing to that of the image processing unit 105, and would output this image data for display to the monitor.

It should be understood that, also in the case of such a monitor that is provided to a display device, in a similar manner to the case with the display device 109 of the above embodiments, it is necessary to it to be adapted to be able to display a three dimensional image by the lenticular method or the parallax barrier method or the like. Moreover, when the multiple viewpoint image file is to be read in from the digital camera 1 by the display device, it would also be acceptable to employ an interface such as, for example, a LAN cable or wireless communication or the like. Yet further, it would also be acceptable to arrange for the viewpoint image data Im to be generated by the external display device reading in the image data generated by the digital camera 1, and by the display device performing similar processing to that of the image processing unit 105.

(2) Instead of generating the plurality of sets of viewpoint image data Im from the image signals stored in the memory 103 by using fixed parameters and variable parameters, it would also be acceptable to generate viewpoint image data Im having a number of viewpoints that is predetermined in advance. In this case, using image signals that are stored in the memory 103, the image processing unit 105 would, for example, generate a hundred sets of viewpoint image data so that viewpoint images from a hundred viewpoints are obtained, and would store them in the memory 103. And, according to variable parameters that are set within the hundred sets of viewpoint image data Im stored in the memory 103, the image processing unit 105 would select the same number of sets of viewpoint image data Im as the number of viewpoints selected by the user, would generate a multiple viewpoint image file, and would record that file upon the memory card 107a.

Moreover, provided that the essence of the present invention is not lost, the present invention is not to be considered as being limited by the embodiments described above; other forms that are considered to fall within the range of the technical concept of the present invention are also included within the scope of the present invention. Furthermore, the structures of the embodiments and variant embodiments that have been employed in the above explanation may be combined in any appropriate manner.

The content of the disclosure of the following application, upon which priority is claimed, is hereby installed herein by reference:

Japanese Patent Application 046,733 of 2010 (filed on 3 Mar. 2010).

The invention claimed is:

1. An image capture device, comprising:
a plurality of microlenses that are arranged in a two dimensional configuration in a vicinity of a focal plane of a photographic optical system;
an image capture element in which a plurality of element groups are arranged in a two dimensional configuration so as respectively to correspond to the microlenses, each element group including a plurality of photoelectric conversion elements that receive via the microlenses light fluxes from a photographic subject that have passed through the photographic optical system and that output image signals;
a setting unit that sets a plurality of different region upon the pupil surface of the photographic optical system;
a generation unit that extracts, among the image signals outputted from the plurality of photoelectric conversion elements included in each of the plurality of element groups, region image signals respectively corresponding to the plurality of different partial regions that are set by the setting unit and that generates, on the basis of the region image signals, a plurality of sets of image data as a plurality of sets of viewpoint image data whose viewpoint positions are different with each other, each of the plurality of sets of image data respectively corresponding to the regions set by the setting unit; and
a viewpoint condition input operation member that inputs a viewpoint condition input operation to input a viewpoint condition, wherein
the setting unit sets the plurality of different region upon the pupil surface of the photographic optical system based upon the viewpoint condition input by the viewpoint condition input operation member,
the viewpoint condition input operation member receives parallax selection operation to select a parallax that specifies an amount of change of viewpoint between the plurality of sets of viewpoint image data,
the setting unit sets the regions at positional intervals that correspond to the parallax selected by the parallax selection operation, and
the generation unit generates the sets of viewpoint image data by extracting the region image signal corresponding to each of the set regions that are positioned apart at the intervals.

2. An image capture device according to claim 1, wherein;
the generation unit generates one of the sets of viewpoint image data by combining together the region image signals that have been extracted from different ones of the element groups among the plurality of region image signals respectively extracted from the plurality of element groups, the different ones of the element groups corresponding to the single region.

3. An image capture device according to claim 1, wherein:
the viewpoint condition input operation member receives a depth selection operation to select the depth of photographic subject field of the image;
the setting unit sets size of the regions according to the depth of photographic subject field selected by the depth selection operation; and
the generation unit generates the sets of viewpoint image data by combining the plurality of the image signals corresponding to the size of the regions that has been set, and extracting the image signals as a single region image signal.

4. An image capture device according to claim 1, wherein:
the viewpoint condition input operation member further receives a viewpoint position selection operation to change the viewpoint positions in a direction in two dimensions and a viewpoint number selection operation to select a number of viewpoints;
the setting unit sets a direction for extraction of the regions whose number is equal to the number of viewpoints, according to the viewpoint position selection operation; and
the generation unit generates the sets of viewpoint image data by extracting the region image signals along the direction set by the setting unit.

5. An image capture device according to claim 1, further comprising:
a display control unit that generates image data for display on the basis of a plurality of the sets of viewpoint image data generated by the generation unit, and that displays an image corresponding to the image data for display as a three dimensional image upon a display device.

6. An image capture device according to claim 1, wherein the viewpoint condition includes at least one of a position of the region, a size of the region, a number of the region, an interval between the different regions, and direction of the regions.

7. An image capture device according to claim 1, wherein the viewpoint condition input operation is at least one of operations to input a position of viewpoint, a number of the plurality of the viewpoint image data, a direction of change of viewpoint, amount of change of viewpoint, and a depth of the photographic subject field of the viewpoint image.

8. An image capture device, comprising:
a plurality of microlenses that are arranged in a two dimensional configuration in a vicinity of a focal plane of a photographic optical system;
an image capture element in which a plurality of element groups are arranged in a two dimensional configuration so as respectively to correspond to the microlenses, each element group including a plurality of photoelectric conversion elements that receive via the microlenses light fluxes from a photographic subject that have passed through the photographic optical system and that output image signals;
a setting unit that sets a plurality of different region upon the pupil surface of the photographic optical system; and
a generation unit that extracts, among the image signals outputted from the plurality of photoelectric conversion elements included in each of the plurality of element groups, region image signals respectively corresponding to the plurality of different partial regions that are set by the setting unit and that generates, on the basis of the region image signals, a plurality of sets of image data as a plurality of sets of viewpoint image data whose viewpoint positions are different with each other, each of the plurality of sets of image data respectively corresponding to the regions set by the setting unit, wherein
if the region set by the setting unit corresponds to a portion of one photoelectric conversion element, the generation unit performs weighting upon the image signal outputted from that the one photoelectric conversion element according to proportion of the corresponding region, and extracts the region image signal.

9. An image capture device, comprising:
a plurality of microlenses that are arranged in a two dimensional configuration in a vicinity of a focal plane of a photographic optical system;
an image capture element in which a plurality of element groups are arranged in a two dimensional configuration so as respectively to correspond to the microlenses, each element group including a plurality of photoelectric conversion elements that receive via the microlenses light fluxes from a photographic subject that have passed through the photographic optical system and that output image signals;
a setting unit that sets a plurality of different region upon the pupil surface of the photographic optical system; and
a generation unit that extracts, among the image signals outputted from the plurality of photoelectric conversion elements included in each of the plurality of element groups, region image signals respectively corresponding to the plurality of different partial regions that are set by the setting unit and that generates, on the basis of the region image signals, a plurality of sets of image data as a plurality of sets of viewpoint image data whose viewpoint positions are different with each other, each of the plurality of sets of image data respectively corresponding to the regions set by the setting unit; and
an attitude determination unit that detects the attitude of the image capture device, wherein:
the setting unit sets the direction for extraction of the regions whose number is equal to a number of viewpoints, so that the positions of the viewpoints differ according to the attitude detected by the attitude determination unit, and
the generation unit generates the viewpoint image data by extracting the region image signals along the direction set by the setting unit.

* * * * *